(12) United States Patent
Liu et al.

(10) Patent No.: US 12,004,096 B2
(45) Date of Patent: Jun. 4, 2024

(54) SIGNAL TRANSMISSION METHOD AND COMMUNICATIONS DEVICE

(71) Applicant: VIVO MOBILE COMMUNICATION CO., LTD., Dongguan (CN)

(72) Inventors: Siqi Liu, Dongguan (CN); Zichao Ji, Dongguan (CN); Kai Wu, Dongguan (CN); Shuai Zhou, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 539 days.

(21) Appl. No.: 17/160,312

(22) Filed: Jan. 27, 2021

(65) Prior Publication Data

US 2021/0153147 A1  May 20, 2021

Related U.S. Application Data

(63) Continuation of application No. PCT/CN2019/096507, filed on Jul. 18, 2019.

(30) Foreign Application Priority Data

Jul. 31, 2018 (CN) .......................... 201810858894.6

(51) Int. Cl.
*H04W 4/00* (2018.01)
*H04W 4/70* (2018.01)
(Continued)

(52) U.S. Cl.
CPC ........... *H04W 56/001* (2013.01); *H04W 4/70* (2018.02); *H04W 4/80* (2018.02); *H04W 88/14* (2013.01)

(58) Field of Classification Search
CPC ....... H04W 56/001; H04W 4/70; H04W 4/80; H04W 88/14; H04W 56/00
(Continued)

(56) References Cited

U.S. PATENT DOCUMENTS 10,425,264 B2 * 9/2019 Ko ........................ H04W 56/00
10,805,863 B2 * 10/2020 Sheng ................. H04W 56/001
(Continued)

FOREIGN PATENT DOCUMENTS

CN       104968052 A      10/2015
CN       106793098 A       5/2017
(Continued)

OTHER PUBLICATIONS

Fourth Office Action issued in related Chinese Application No. 201810858894.6, dated Apr. 1, 2022, 6 pages.
(Continued)

*Primary Examiner* — Marceau Milord
(74) *Attorney, Agent, or Firm* — IPX PLLC

(57) ABSTRACT

Embodiments of this disclosure provide a signal transmission method and a communications device. The signal transmission method includes: obtaining auxiliary information of a synchronization signal of a preset operation frequency band; and transmitting or receiving the synchronization signal based on the auxiliary information, where the preset operation frequency band is an operation frequency band of a preset service, and the preset service is a sidelink service, an mMTC service, an NB-IoT service, or an IAB service; or the preset operation frequency band is an unlicensed frequency band.

17 Claims, 4 Drawing Sheets

(51) Int. Cl.
*H04W 4/80* (2018.01)
*H04W 56/00* (2009.01)
*H04W 88/14* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 11,316,643 B2* | 4/2022 | Yang | ..................... | H04W 72/23 |
| 11,533,779 B2* | 12/2022 | Wang | ..................... | H04W 48/12 |
| 11,659,568 B2* | 5/2023 | Tang | ..................... | H04L 5/0053 |
| | | | | 370/330 |
| 11,722,960 B2* | 8/2023 | Freda | ................ | H04W 52/0232 |
| | | | | 370/311 |
| 2011/0117911 A1* | 5/2011 | Narang | ................. | H04W 48/16 |
| | | | | 455/434 |
| 2015/0271847 A1* | 9/2015 | Luo | ...................... | H04W 56/00 |
| | | | | 370/329 |
| 2016/0112168 A1* | 4/2016 | Yoo | ....................... | H04W 16/14 |
| | | | | 370/280 |
| 2017/0142703 A1 | 5/2017 | Xue et al. | | |
| 2018/0159649 A1 | 6/2018 | Sun et al. | | |
| 2018/0167155 A1* | 6/2018 | Sun | ....................... | H04L 5/0092 |
| 2018/0198659 A1 | 7/2018 | Ko et al. | | |
| 2019/0289561 A1* | 9/2019 | Corley | .................. | H04W 24/02 |
| 2019/0297642 A1* | 9/2019 | Sun | ....................... | H04L 1/1896 |
| 2020/0007371 A1* | 1/2020 | Ko | ....................... | H04L 27/2602 |
| 2020/0120756 A1* | 4/2020 | Wang | .................... | H04W 24/10 |
| 2020/0146041 A1* | 5/2020 | Kim | ..................... | H04J 11/0086 |
| 2020/0162220 A1* | 5/2020 | Yang | ..................... | H04L 1/0039 |
| 2020/0205134 A1* | 6/2020 | Pan | ........................ | H04W 72/04 |
| 2021/0014791 A1* | 1/2021 | Freda | ................ | H04W 52/0216 |

FOREIGN PATENT DOCUMENTS

| | | | |
|---|---|---|---|
| CN | 107733829 A | 2/2018 | |
| CN | 107889237 A | 4/2018 | |
| CN | 107920364 A | 4/2018 | |
| CN | 108303715 A | 7/2018 | |
| WO | WO-2016049126 A1 * | 3/2016 | ......... H04L 27/0006 |
| WO | 2017070944 A1 | 5/2017 | |
| WO | WO-2018225989 A1 * | 12/2018 | ......... H04J 11/0069 |

OTHER PUBLICATIONS

International Search Report issued in corresponding International Application No. PCT/CN2019/096507, dated Sep. 27, 2019, 4 pages.
Ericsson, "Sparse grid concept for TRP measurements", R4-1809093, Jul. 6, 2018, section 2.
Search Report issued in related Chinese Application No. 201810858894.6, dated Jun. 16, 2020, 10 pages.
First Office Action issued in related Chinese Application No. 201810858894.6, dated Jul. 2, 2020, 10 pages.
RRC Configuration for NR-ARFCN and GSCN: 3GPP TSG-RAN WG2 Meeting AH-1801; R2-1800649; MediaTek Inc.
Second Office Action issued in related Chinese Application No. 201810858894.6, dated Nov. 4, 2020, 8 pages.

* cited by examiner

SIGNAL TRANSMISSION METHOD AND COMMUNICATIONS DEVICE

CROSS-REFERENCE TO RELATED APPLICATIONS

This application is a bypass continuation of PCT Application No. PCT/CN2019/096507 filed Jul. 18, 2019, which claims priority to Chinese Patent Application No. 201810858894.6 filed in China on Jul. 31, 2018, both of which are incorporated herein by reference in their entireties.

TECHNICAL FIELD

Embodiments of this disclosure relate to the field of wireless communications technologies, and in particular, to a signal transmission method and a communications device.

BACKGROUND

In long term evolution (LTE), a base station transmits a frequency domain position of a sidelink (Sidelink) service to a terminal by using a system information block (SIB) message; or a manufacturer pre-configures a frequency domain position of a sidelink service for the terminal, and the terminal determines, based on the configuration, frequency domain positions for transmitting and receiving a sidelink synchronization signal and/or a broadcast channel on different carriers. For a given carrier, a frequency domain position of the sidelink synchronization signal is fixed on six resource blocks (RB) in the center of the carrier.

When the terminal is in an initial synchronization phase or has no prior information of the carrier, the terminal may not be able to determine a position of the synchronization signal. In this case, the terminal needs to search for synchronization signals evenly spaced apart by 100 kHz one by one.

A synchronization raster is defined to be 0-100 GHz in new radio (NR). A frequency position of a synchronization signal block (SSB, or referred to as SS/PBCH block, synchronization signal/physical broadcast signal block) on an operation frequency band is SSREF, corresponding to a global synchronization raster number (GSCN). The base station may transmit a synchronization signal block on the synchronization raster. A position of a synchronization raster is not fixed at the center of a carrier in which the raster is located. Therefore, the base station can more flexibly configure the carrier and transmit the synchronization signal block.

In addition, a large bandwidth is introduced in NR, and a bandwidth of a high frequency band may reach 400 MHz or even up to 1 GHz.

In NR, the base station and the manufacturer may be allowed to more flexibly configure a sidelink carrier and a synchronization signal in the frequency domain, and therefore the position of the synchronization signal is no longer fixed at the center of the carrier. However, due to the large bandwidth supported in NR, if searching for synchronization signals is still performed evenly spaced apart by 100 kHz one by one, time and power consumption for synchronization of the terminal will be greatly increased.

SUMMARY

Embodiments of this disclosure provide a signal transmission method and a communications device, so as to resolve a problem of low communication efficiency because a frequency domain position for transmitting or receiving a synchronization signal cannot be rapidly determined on some operation frequency bands.

In order to resolve the foregoing technical problem, this disclosure is implemented as follows:

According to a first aspect, an embodiment of this disclosure provides a signal transmission method, applied to a communications device and including:
  obtaining auxiliary information of a synchronization signal of a preset operation frequency band; and
  transmitting or receiving the synchronization signal based on the auxiliary information; where
  the preset operation frequency band is an operation frequency band of a preset service, and the preset service is a sidelink service, a massive machine-type communication (mMTC) service, a narrowband internet of things (NB-IoT) service, or an integrated access backhaul (IAB) service; or the preset operation frequency band is an unlicensed frequency band.

According to a second aspect, an embodiment of this disclosure provides a communications device, including:
  an obtaining module, configured to obtain auxiliary information of a synchronization signal of a preset operation frequency band; and
  a transmission module, configured to transmit or receive the synchronization signal based on the auxiliary information.

The preset operation frequency band is an operation frequency band of a preset service, and the preset service is a sidelink service, an mMTC service, an NB-IoT service, or an IAB service; or the preset operation frequency band is an unlicensed frequency band.

According to a third aspect, an embodiment of this disclosure provides a communications device, including a processor, a memory, and a computer program stored in the memory and capable of running on the processor. When the computer program is executed by the processor, the steps of the signal transmission method described above are implemented.

According to a fourth aspect, an embodiment of this disclosure provides a computer-readable storage medium. The computer-readable storage medium stores a computer program, and when the computer program is executed by a processor, the steps of the signal transmission method described above are implemented.

In some embodiments of this disclosure, a frequency domain position for transmitting or receiving the synchronization signal can be quickly determined based on the auxiliary information of the synchronization signal, thereby improving communication efficiency.

BRIEF DESCRIPTION OF DRAWINGS

Other advantages and benefits will become apparent to those of ordinary skill in the art by reading the following detailed descriptions of optional implementations. The accompanying drawings are merely intended to illustrate the purposes of the optional implementations, and should not be construed as a limitation on this disclosure. In addition, throughout the accompanying drawings, the same components are denoted by the same reference numerals. In the drawings.

DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

The term "include" or any of its variants in the specification and claims of this application are intended to cover a non-exclusive inclusion, such that a process, a method, a system, a product, or a device that includes a series of steps or units not only includes those expressly listed steps or units but also includes other steps or units that are not expressly listed, or further includes elements inherent to such process, method, system, product, or device. In addition, in the specification and claims, the use of "and/or" represents presence of at least one of the connected objects, for example, "A and/or B" indicates that the following three cases: only A, only B, and both A and B.

It should be noted that, in some embodiments of this disclosure, words such as "exemplary" or "for example" are used to represent an example, an instance, or an illustration. Any embodiment or design scheme described as "exemplary" or "for example" in the embodiments of this disclosure should not be construed as being more preferred or advantageous than other embodiments or design schemes. To be precise, the use of terms such as "exemplary" or "for example" is intended to present a related concept in a specific manner.

Figure 1:
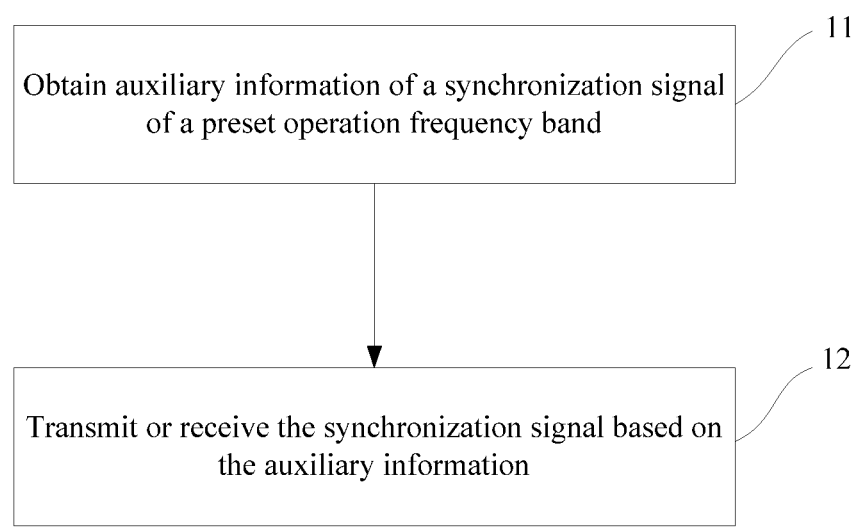
FIG. 1 is a schematic flowchart of a signal transmission method according to an embodiment of this disclosure.

Referring to FIG. 1, FIG. 1 is a schematic flowchart of a signal transmission method according to an embodiment of this disclosure. The signal transmission method is applied to a communications device and includes the following steps.

Step 11: Obtain auxiliary information of a synchronization signal of a preset operation frequency band.

Step 12: Transmit or receive the synchronization signal based on the auxiliary information.

The preset operation frequency band is an operation frequency band of a preset service, and the preset service is a sidelink service, an mMTC service, an NB-IoT service, or an IAB service; or the preset operation frequency band is an unlicensed frequency band.

In this embodiment of this disclosure, a frequency domain position for transmitting or receiving the synchronization signal can be quickly determined based on the auxiliary information of the synchronization signal, thereby improving communication efficiency.

In this embodiment of this disclosure, when the preset operation frequency band is the operation frequency band of the preset service or the preset operation frequency band is an unlicensed frequency band, the communications device may indicate a service type in at least one of a synchronization signal, a physical broadcast channel, a service discovery channel, a data channel, a control channel, or a reference signal. The service type includes at least one of sidelink, mMTC, NB-IoT, IAB, or NR. A manner of carrying indication information of the service type may be explicit carrying or implicit carrying.

In the explicit carrying manner, possible methods include: indicating the service type by using some bits of at least one of the physical broadcast channel, the service discovery channel, the data channel, or the control channel. For example, a specific bit of the physical broadcast channel is the indication information of the service type. When the bit has one of values 0 and 1, it indicates a sidelink service, and the physical broadcast channel is a sidelink physical broadcast channel; when the bit has a value other than 0 and 1, it indicates a non-sidelink service, and the physical broadcast channel is not a sidelink physical broadcast channel. Optionally, it may also represent another service, and the physical broadcast channel is a physical broadcast channel of the another service, such as a physical broadcast channel of NR.

In the implicit carrying manner, possible methods include at least one of the following:

1. performing joint coding on service indication information and a parameter of at least one of the physical broadcast channel, the service discovery channel, the data channel, or the control channel.
2. carrying the service type in at least one of the following information:
   (a) a sequence ID of the synchronization signal;
   (b) a mask of the synchronization signal;
   (c) a mapping sequence of the synchronization signal;
   (d) a sequence of a reference signal;
   (e) a mapping sequence of the reference signal;
   (f) the number of reference signals;
   (g) a time domain position of the reference signal;
   (h) a frequency domain position of the reference signal;
   (i) a cell identity;
   (j) a mask of the reference signal; or
   (k) a scrambling code of the reference signal.

The reference signal is at least one of a sounding reference signal (SRS), a demodulation reference signal (DMRS), a channel state information reference signal (CSI-RS), or a phase tracking reference signal (PT-RS).

When the preset service is a sidelink service, the communications device is a terminal, and the terminal may be a transmit end of the synchronization signal or a receiving device of the synchronization signal. When the terminal is the transmit end of the synchronization signal, the terminal can quickly determine a frequency domain position for transmitting the synchronization signal based on the auxiliary information of the synchronization signal, and transmit the synchronization signal at the determined frequency domain position, thereby improving communication efficiency. When the terminal is the receiving device of the synchronization signal, the terminal can quickly determine a frequency domain position for receiving the synchronization signal based on the auxiliary information of the synchronization signal, and search for the synchronization signal at the determined frequency domain position, thereby reducing search complexity, reducing power consumption, and improving communication efficiency.

When the preset service is a sidelink service, the synchronization signal is a sidelink synchronization signal. It should be noted that the sidelink service refers to a service performed on the sidelink, including at least one of communications services performed on the sidelink such as device-to-device (D2D) or vehicle-to-everything (V2X). V2X mainly includes at least one of vehicle-to-vehicle (V2V) communication, vehicle-to-infrastructure (V2I) communication, vehicle-to-network (V2N) communication, or vehicle-to-pedestrian communication (V2P).

When the preset operation frequency band is an unlicensed frequency band, or the preset service is an mMTC service, an NB-IoT service, or an IAB service, the communications device may be a network-side device or a terminal, where the network-side device is a transmit end of the synchronization signal, and the terminal is a receiving device of the synchronization signal. When the communications device is a network-side device, the network-side device can quickly determine a frequency domain position for transmitting the synchronization signal based on the auxiliary information of the synchronization signal, and transmit the synchronization signal at the determined frequency domain position, thereby improving communication efficiency. When the communications device is a terminal, the terminal can quickly determine a frequency domain position for receiving the synchronization signal based on the auxiliary information, and search for the synchronization signal at the determined frequency domain position, thereby reducing search complexity, reducing power consumption, and improving communication efficiency.

When the preset operation frequency band is an unlicensed frequency band, the synchronization signal may be transmitted in a form of an SSB.

In some embodiments of this disclosure, when the preset service is the sidelink service, the communications device is a terminal, and the auxiliary information is obtained in at least one of the following manners: being transmitted by the network-side device, being pre-configured on the terminal, being specified by the protocol, or being transmitted by another terminal.

The auxiliary information may include a plurality of pieces of information. In some embodiments, a part of the auxiliary information may be obtained in one of the foregoing manners, and the other part of the auxiliary information may be obtained in another of the foregoing manners.

When the preset operation frequency band is an unlicensed frequency band, or the preset service is an mMTC service, an NB-IoT service, or an IAB service, the communications device is a terminal or a network-side device; and when the communications device is a terminal, the terminal is a receiving device of the synchronization signal, and the auxiliary information is obtained in at least one of the following manners: being transmitted by the network-side device, being pre-configured on the terminal, or being specified by the protocol.

In some embodiments of this disclosure, when the auxiliary information is configured by the network-side device, the network-side device uses system information, a radio resource control (RRC) message, downlink control information (DCI), or physical downlink shared channel (PDSCH) to carry the auxiliary information.

In some embodiments of this disclosure, the auxiliary information includes at least one of the following: pattern information of a synchronization raster, or other related information of the synchronization signal.

In some embodiments of this disclosure, the other related information includes at least one of the following information:

(1) a carrier bandwidth;
(2) a frequency domain position of a carrier; where
the frequency domain position of the carrier is, for example, a new radio absolute radio frequency channel number (NR-ARFCN);or
(3) synchronization signal sequence related information; where the synchronization signal sequence related information includes, for example, at least one of a sequence ID of a primary synchronization signal (PSS) or a sequence ID of a secondary synchronization signal (SSS); and in a case of a sidelink synchronization signal, the synchronization signal sequence related information includes, for example, at least one of an ID of a primary sidelink synchronization signal (PSSS), an ID of a secondary sidelink synchronization signal (SSSS), or an ID of a sidelink synchronization signal (SLSS) (SLSS ID for short);

(4) a subcarrier spacing (SCS);
(5) a cyclic prefix (CP) length;
(6) a pattern of positions of the synchronization signal; where
the pattern of positions of the synchronization signal is, for example, a synchronization signal pattern based on a slot (slot) level or a synchronization signal pattern based on a mini-slot (mini-slot or referred to as sub-slot);
(7) a transmission period of the synchronization signal; for example, a transmission period of the SLSS;
(8) whether the synchronization signal is transmitted periodically;
(9) a transmitting window length;
(10) a transmitting window periodicity;
(11) a receiving window length;
(12) a receiving window periodicity;
(13) a cell identity;
for example, a physical cell identity ID (Physical Cell identity);
(14) a mapping relationship between a cell and a receive window of the synchronization signal;
(15) a transmission parameter;
for example, including least one of a power control parameter, a transmit beam (beam) identifier, and a receive beam identifier;
(16) a pattern of rate matching resources; where
the pattern of rate matching resources includes time domain and/or frequency domain positions of one or more synchronization signals and/or broadcast channels and/or service discovery channels, in a form of index (index), bitmap (bitmap), or specific quantity. The communications device does not attempt to transmit or receive other signals at the indicated time domain and/or frequency domain position;
(17) a to-be-punctured resource pattern; where
the to-be-punctured resource pattern includes time domain and/or frequency domain positions of one or more synchronization signals and/or broadcast channels and/or service discovery channels, in a form of index (index), bitmap (bitmap), or specific quantity; and when resources allocated to other signals and/or channels (signals and/or channels other than a signal and/or channel corresponding to the to-be-punctured resource pattern) overlap the indicated time domain and/or frequency domain position, the communications device considers that other signals are mapped and punched in an overlapping part;
(18) a time domain offset;
(19) a synchronization source;
(20) a filter parameter of the synchronization signal; and
(21) service discovery related information.

Corresponding to any one of the foregoing other related information, the auxiliary information may include one or more pieces. For example, the auxiliary information includes the subcarrier spacing, and a quantity of subcarrier spacings included in the auxiliary information may be one or more.

In some embodiments of this disclosure, the pattern information of the synchronization raster includes at least one of the following:
  (a) a type of the synchronization raster, where the type of the synchronization raster includes: a relative synchronization raster and a global synchronization raster;
  (b) a frequency domain unit difference between synchronization rasters, where the frequency domain unit difference between synchronization rasters may include: at least one of a frequency domain unit difference (rastergap1) of the relative synchronization raster or a frequency domain unit difference (rastergap2) of the global synchronization raster;
  (c) a frequency domain offset of the synchronization raster, where the frequency domain offset of the synchronization raster may include: at least one of a frequency domain offset of the relative synchronization raster aor a frequency domain offset of the global synchronization raster;
  (d) a synchronization raster number;
  (e) a step size S (stepsize) between adjacent synchronization raster numbers;
  (f) indication information of the synchronization raster, where the indication information of the synchronization raster may include: at least one of a quantity N of synchronization rasters or bitmap (bitmap) information of the synchronization raster;
  (g) a frequency domain position of the synchronization raster; where
  the frequency domain position of the synchronization raster may be a global frequency domain position or a relative frequency domain position; and
  (h) a measurement threshold of the synchronization raster.

When the auxiliary information includes a specific type of the pattern information of the synchronization raster described above, one or more pieces of this type of the pattern information of the synchronization raster may be included.

The frequency domain unit difference between synchronization rasters is a frequency domain interval between two adjacent frequency domain positions used for transmitting the synchronization signal on the carrier, and usually may also be directly referred to as the synchronization raster.

In some embodiments of this disclosure, when the auxiliary information includes the pattern information of the synchronization raster, the step of transmitting or receiving the synchronization signal based on the auxiliary information includes:
  obtaining, based on the pattern information of the synchronization raster, a first synchronization raster for transmitting or receiving the synchronization signal; and
  transmitting or receiving the synchronization signal on the first synchronization raster.

(A) For the type of the synchronization raster described above:

In some embodiments of this disclosure, the step of obtaining, based on the pattern information of the synchronization raster, a first synchronization raster for transmitting or receiving the synchronization signal includes:
  if the pattern information of the synchronization raster includes the type of the synchronization raster (which is the global synchronization raster or the relative synchronization raster), determining a type of the first synchronization raster; and
  obtaining the first synchronization raster based on the type of the first synchronization raster.

In some embodiments of this disclosure, the step of obtaining, based on the pattern information of the synchronization raster, a first synchronization raster for transmitting or receiving the synchronization signal includes:
  if the pattern information of the synchronization raster does not include the type of the synchronization raster, considering that the first synchronization raster is a global synchronization raster or a relative synchronization raster by default; and
  obtaining the first synchronization raster based on the type of the first synchronization raster.

In some embodiments, if the type of the first synchronization raster is the global synchronization raster, the global synchronization raster is used as the first synchronization raster.

In other embodiments, the step of obtaining the first synchronization raster based on the type of the first synchronization raster includes:
  obtaining the first synchronization raster based on the type of the first synchronization raster and pattern information of another synchronization raster, where the pattern information of the another synchronization raster includes: at least one of a frequency domain unit difference between synchronization rasters, a frequency domain offset of the synchronization raster, a synchronization raster number, an adjacent synchronization raster number, indication information of the synchronization raster, or a step size S of a frequency domain position of the synchronization raster.

(B) For the frequency domain unit difference between synchronization rasters described above:

(B1) In some embodiments of this disclosure, the step of obtaining, based on the pattern information of the synchronization raster, a first synchronization raster for transmitting or receiving the synchronization signal includes:
  if the type of the synchronization raster is the relative synchronization raster, obtaining a reference position corresponding to the relative synchronization raster; and
  if the pattern information of the synchronization raster includes the frequency domain unit difference (rastergap 1) of the synchronization raster, using frequency domain positions evenly spaced apart by the frequency domain unit difference between synchronization rasters starting from the reference position as the first synchronization raster that is obtained.

(B2) Further, if the pattern information of the synchronization raster includes the frequency domain unit difference between synchronization rasters and the frequency domain offset of the synchronization raster, the first synchronization raster is frequency domain positions evenly spaced apart by the frequency domain unit difference between synchronization rasters starting from a position that is away from the reference position by the frequency domain offset of the synchronization raster.

In some embodiments of this disclosure, the reference position is a lowest frequency domain position, a highest frequency domain position, or a central position of a carrier used for transmitting the synchronization signal.

In some embodiments of this disclosure, the reference position is configured by the network-side device, preconfigured in the communications device, or specified by the protocol.

(C) For the global synchronization raster described above:

In some embodiments of this disclosure, the global synchronization raster is a global synchronization raster within a frequency domain range of a specified operation frequency band predefined by the protocol. The specified operation frequency band is the preset operation frequency band, a frequency band to which a carrier used for transmitting the synchronization signal belongs, or a specified frequency band.

(C1) In some embodiments of this disclosure, the step of obtaining, based on the pattern information of the synchronization raster, a first synchronization raster for transmitting or receiving the synchronization signal includes:

if the type of the synchronization raster is the global synchronization raster, and the pattern information of the synchronization raster includes the frequency domain unit difference of the global synchronization raster, using global synchronization rasters evenly spaced apart by the frequency domain unit difference between synchronization rasters in the global synchronization raster as the first synchronization raster that is obtained.

(D) For the synchronization raster number:

In this embodiment of this disclosure, the synchronization raster number may be a global synchronization raster number or a relative synchronization raster number.

(D1) In some embodiments of this disclosure, the step of obtaining, based on the pattern information of the synchronization raster, a first synchronization raster for transmitting or receiving the synchronization signal includes:

if the pattern information of the synchronization raster includes the synchronization raster number and the number is a global synchronization raster number, obtaining, from the global synchronization raster, the global synchronization raster corresponding to the number as the first synchronization raster.

(D2) In some embodiments of this disclosure, the step of obtaining, based on the pattern information of the synchronization raster, a first synchronization raster for transmitting or receiving the synchronization signal includes:

if the pattern information of the synchronization raster includes the synchronization raster number, and the number is a relative synchronization raster number, obtaining the relative synchronization raster based on at least one of a reference position corresponding to the synchronization raster, the frequency domain unit difference between synchronization rasters, the frequency domain offset of the synchronization raster, the step size between adjacent synchronization raster numbers, or a frequency domain position of the synchronization signal; and using a relative synchronization raster corresponding to the number as the first synchronization raster.

In some embodiments of this disclosure, the reference position is a lowest frequency domain position, a highest frequency domain position, or a central position of a carrier used for transmitting the synchronization signal.

In some embodiments of this disclosure, the reference position is configured by the network-side device, preconfigured in the communications device, or specified by the protocol.

(E) For the step size between adjacent synchronization raster numbers:

In some embodiments of this disclosure, the step of obtaining, based on the pattern information of the synchronization raster, a first synchronization raster for transmitting or receiving the synchronization signal includes:

if the pattern information of the synchronization raster includes the step size between adjacent synchronization raster numbers, obtaining the first synchronization raster based on the step size between adjacent synchronization raster numbers.

In some embodiments of this disclosure, the step of obtaining the first synchronization raster based on the step size S between adjacent synchronization raster numbers includes:

if the type of the first synchronization raster is the global synchronization raster, selecting synchronization rasters evenly spaced apart by S global synchronization rasters as the first synchronization raster.

In some embodiments of this disclosure, the step of obtaining, based on the pattern information of the synchronization raster, a first synchronization raster for transmitting or receiving the synchronization signal includes:

if the pattern information of the synchronization raster includes the step size between adjacent synchronization raster numbers, obtaining the first synchronization raster based on the type of the synchronization raster, the step size between adjacent synchronization raster numbers, and pattern information of another synchronization raster, where the pattern information of the another synchronization raster includes at least one of a reference position corresponding to the synchronization raster, a frequency domain unit difference between synchronization rasters, a frequency domain offset of the synchronization raster, a number of the synchronization signal, indication information of the synchronization raster, or a frequency domain position of the synchronization raster.

In some embodiments of this disclosure, the reference position is a lowest frequency domain position, a highest frequency domain position, or a central position of a carrier used for transmitting the synchronization signal.

In some embodiments of this disclosure, the reference position is configured by the network-side device, preconfigured in the communications device, or specified by the protocol.

(F) For the indication information of the synchronization raster:

(F1) In some embodiments of this disclosure, the step of obtaining, based on the pattern information of the synchronization raster, a first synchronization raster for transmitting or receiving the synchronization signal includes:

if the pattern information of the synchronization raster includes the indication information of the synchronization raster, the indication information of the synchronization raster includes a quantity N of the synchronization rasters, and the type of the synchronization raster is the global synchronization raster, selecting N global synchronization rasters from the global synchronization raster as the first synchronization raster.

The selected N synchronization rasters may be the first N synchronization rasters, the last N synchronization rasters, or N synchronization rasters starting from a specified position in the global synchronization raster.

(F2) The step of obtaining, based on the pattern information of the synchronization raster, a first synchronization raster for transmitting or receiving the synchronization signal includes:

if the pattern information of the synchronization raster includes the indication information of the synchronization raster, the indication information of the synchronization raster includes a quantity N of the synchronization rasters, and the type of the synchronization raster is the relative synchronization raster, obtaining the relative synchronization raster based on at least one of a reference position of the synchronization raster, the frequency domain unit difference between synchronization rasters, the frequency domain offset of the synchronization raster, the synchronization raster number, the step size between adjacent synchronization raster numbers, or the frequency domain position of the synchronization raster; and selecting N relative synchronization rasters from the relative synchronization raster as the first synchronization raster.

The selected N synchronization rasters may be the first N synchronization rasters, the last N synchronization rasters, or N synchronization rasters starting from a specified position in the relative synchronization raster.

(F3) In some embodiments of this disclosure, the step of obtaining, based on the pattern information of the synchronization raster, a first synchronization raster for transmitting or receiving the synchronization signal includes:

if the pattern information of the synchronization raster includes the indication information of the synchronization raster, the indication information of the synchronization raster includes a quantity N of the synchronization rasters, and the type of the synchronization raster is the relative synchronization raster, using frequency domain positions evenly spaced apart by a fixed distance starting from a reference position corresponding to the synchronization raster as the first synchronization raster, where the fixed distance is equal to a result obtained by rounding up a carrier bandwidth/N.

The selected N synchronization rasters may be the first N synchronization rasters, the last N synchronization rasters, or N synchronization rasters starting from a specified position in the relative synchronization raster.

In some embodiments of this disclosure, the reference position is a lowest frequency domain position, a highest frequency domain position, or a central position of a carrier used for transmitting the synchronization signal.

In some embodiments of this disclosure, the reference position is configured by the network-side device, pre-configured in the communications device, or specified by the protocol.

(F4) In some embodiments of this disclosure, the step of obtaining, based on the pattern information of the synchronization raster, a first synchronization raster for transmitting or receiving the synchronization signal includes:

if the pattern information of the synchronization raster includes the indication information of the synchronization raster, the indication information of the synchronization raster includes bitmap information of the synchronization raster, and the type of the synchronization raster is the global synchronization raster, selecting a global synchronization raster corresponding to the bitmap information from the global synchronization raster as the first synchronization raster.

Optionally, in some embodiments, a global synchronization raster corresponding to a bit of 0 in the bitmap information belongs to the first synchronization raster. In other embodiments, a global synchronization raster corresponding to a bit of 1 in the bitmap information belongs to the first synchronization raster.

Optionally, high-order and low-oder bits in the bitmap information sequentially correspond to a high frequency domain and a low frequency domain of the global synchronization raster respectively, and the correspondence may be one-to-many, many-to-one, or one-to-one. Alternatively, low-order and high-order bits in the bitmap information sequentially correspond to a high frequency domain and a low frequency domain of the global synchronization raster respectively, and the correspondence may be one-to-many, many-to-one, or one-to-one.

(F5) In some embodiments of this disclosure, the step of obtaining, based on the pattern information of the synchronization raster, a first synchronization raster for transmitting or receiving the synchronization signal includes:

if the pattern information of the synchronization raster includes the indication information of the synchronization raster, the indication information of the synchronization raster includes bitmap information of the synchronization rasters, and the type of the synchronization raster is the relative synchronization raster, obtaining the relative synchronization raster based on a reference position of the synchronization raster, the frequency domain unit difference between synchronization rasters, the frequency domain offset of the synchronization raster, the synchronization raster number, the step size S between adjacent synchronization raster numbers, and the frequency domain position of the synchronization raster; and selecting the relative synchronization raster corresponding to the bitmap information from the relative synchronization raster as the first synchronization raster.

Optionally, in some embodiments, a relative synchronization raster corresponding to a bit of 0 in the bitmap information belongs to the first synchronization raster. In other embodiments, a relative synchronization raster corresponding to a bit of 1 in the bitmap information belongs to the first synchronization raster.

Optionally, high-order and low-oder bits in the bitmap information sequentially correspond to a high frequency domain and a low frequency domain of the relative synchronization raster respectively, and the correspondence may be one-to-many, many-to-one, or one-to-one. Alternatively, low-order and high-order bits in the bitmap information sequentially correspond to a high frequency domain and a low frequency domain of the relative synchronization raster respectively, and the correspondence may be one-to-many, many-to-one, or one-to-one.

In some embodiments of this disclosure, the communications device is a terminal, and the step of obtaining, based on the pattern information of the synchronization raster, a first synchronization raster for transmitting or receiving the synchronization signal includes:

if a frequency domain range of the carrier is able to be determined based on the auxiliary information, and the first synchronization raster that is obtained is at least partially located in the frequency domain range of the carrier, searching, by the terminal, for the synchronization signal only in the first synchronization raster within the frequency domain range of the carrier.

In some embodiments of this disclosure, the communications device is a terminal, and the step of obtaining, based on the pattern information of the synchronization raster, a first synchronization raster for receiving the synchronization signal includes:

if a frequency domain range of the carrier is able to be determined based on the auxiliary information, and the first synchronization raster that is obtained is at least partially located beyond the frequency domain range of the carrier, ignoring, by the terminal, the first synchronization raster beyond the frequency domain range of the carrier.

In some embodiments of this disclosure, the step of obtaining, based on the pattern information of the synchronization raster, a first synchronization raster for transmitting or receiving the synchronization signal includes:

if a frequency domain position of the first synchronization raster that is obtained overlaps a frequency domain position of a synchronization raster of a new radio NR network, skipping the overlapping frequency domain position.

In some embodiments of this disclosure, if the frequency domain position of the first synchronization raster that is obtained overlaps the frequency domain position of the synchronization raster of the NR network, and at least one of a reference signal received power RSRP, a reference signal received quality RSRQ, or a reference signal received strength RSSI of a synchronization signal at the overlapping frequency domain position is greater than a corresponding measurement threshold, the overlapping frequency domain position is skipped.

Specifically, the measurement thresholds corresponding to the RSRP, RSRQ, and RSSI may be the same or different The frequency domain position of the synchronization signal block within different frequency domains of the NR network and a GSCN calculation method are shown in Table 1.

TABLE 1

GSCN parameters for the global synchronization raster
(GSCN parameters for the global frequency raster)

| Frequency range (Frequency range) | Frequency domain position of a synchronization signal block (SS Block frequency position $SS_{REF}$) | GSCN | Range of GSCN (Range of GSCN) |
|---|---|---|---|
| 0-3000 MHz | N*1200 kHz + M*50 kHz, N = 1:2499, M∈{1, 3, 5}(Note 1) | 3N + (M − 3)/2 | 2-7498 |
| 3000-24250 MHz | 3000 MHz + N*1.44 MHz N = 0:14756 | 7499 + N | 7499-22255 |
| 24250-100000 MHz | 24250.08 MHz + N*17.28 MHz, N = 0:4383 | 22256 + N | 22256-26639 |

For example, when GSCN=2, N=1 and M=1 can be deduced, so that the frequency domain position corresponding to the synchronization signal block is 1250 kHz.

In this embodiment of this disclosure, when the first synchronization raster is the global synchronization raster, the frequency domain position and GSCN of the first synchronization raster may be determined in the following manner:

If the preset operation frequency band overlaps the range of 0-3000 MHz, a frequency domain position of the first synchronization raster in the overlapping part of the preset operation frequency band is: Offset1+stepsize1*N1*X+M1*50 kHz. A first global synchronization raster number GSCN of the first synchronization raster in the overlapping part of the preset operation frequency band is: 3N1+(M1−3)/2, where Offset1 is a frequency domain offset of the first synchronization raster, stepsize1 is a step size between first GSCNs of adjacent first synchronization rasters, X is a frequency domain unit difference between adjacent first synchronization rasters, and Offset1, N1, and M1 are all integers. If the preset operation frequency band overlaps the range of 3000-24250 MHz, the frequency domain position of the first synchronization raster in the overlapping part of the preset operation frequency band is: Offset2+R1+stepsize2*N2*Y, the first GSCN of the first synchronization raster in the overlapping part of the preset operation frequency band is: GSCN_offset1+N2, where Offset2 is the frequency domain offset of the first synchronization raster, R1 is the frequency domain position of the first synchronization raster in the lowest frequency domain within the range of 3000-24250 MHz, stepsize2 is the step size between first GSCNs of adjacent first synchronization rasters, Y is the frequency domain unit difference between adjacent first synchronization rasters, GSCN_offset1 is determined by a maximum value of the first GSCN of the first synchronization raster in the range of 0-3000 MHz, and GSCN_offset1, Offset2, and N2 are all integers.

If the preset operation frequency band overlaps the range of 24250-100000 MHz, the frequency domain position of the first synchronization raster in the overlapping part of the preset operation frequency band is: Offset3+R2+stepsize3*N3*Z, the first GSCN of the first synchronization raster in the overlapping part of the preset operation frequency band is: GSCN_offset2+N2, where Offset3 is the frequency domain offset of the first synchronization raster, R2 is the frequency domain position of the first synchronization raster in the lowest frequency domain within the range of 24250-100000 MHz, stepsize3 is the step size between first GSCNs of adjacent first synchronization rasters, Z is the frequency domain unit difference between adjacent first synchronization rasters, GSCN_offset2 is determined by a maximum value of the first GSCN of the first synchronization raster in the range of 3000-24250 MHz, and GSCN_offset2, Offset3, and N3 are all integers.

In the foregoing embodiment, X, Y, and Z are the frequency domain unit differences (rastergap2) of the global synchronization rasters in the foregoing embodiment.

In some embodiments of this disclosure, the signal transmission method may further include: transmitting or receiving at least one of a broadcast channel, a service discovery channel, a data channel, or a control channel based on the auxiliary information.

The foregoing signal transmission method of this disclosure may be applied to an NR system or a later evolved communications system.

The following describes the signal transmission method of this disclosure by using examples with reference to specific embodiments.

Embodiment 1

The network-side device broadcasts the auxiliary information of the synchronization signal, corresponding to carrier 1 (carrier 1). The pattern information of the synchronization raster indicates that the frequency domain unit difference of the relative synchronization raster is rastergap1=3600 kHz, and the reference position is predefined as a lowest point of carrier 1. In this case, within the frequency domain range of carrier 1, first synchronization rasters are evenly spaced apart by 3600 kHz starting from the lowest position of the frequency domain of carrier 1. The terminal transmits or receives a sidelink synchronization signal and/or broadcast channel thereon.

Embodiment 2

The network-side device broadcasts the auxiliary information of the synchronization signal, corresponding to carrier 1, where SCS=15 kHz, the pattern information of the synchronization raster indicates that the frequency domain unit difference of the relative synchronization raster is rastergap1=3600 kHz, and the frequency domain offset of the relative synchronization raster is offset1=10RB. In this case, within the frequency domain range of carrier 1, first synchronization rasters are evenly spaced apart by 3600 kHz starting from a position 1800 kHz away from the lowest position of the frequency domain of carrier 1. The terminal transmits or receives a sidelink synchronization signal and/or broadcast channel thereon.

Embodiment 3

The network-side device broadcasts the auxiliary information of the synchronization signal, corresponding to carrier 1, where SCS=15 kHz, a carrier bandwidth is 20 MHz (106 RBs), and the pattern information of the synchronization raster indicates that a quantity of relative synchronization rasters is 20. In this case, within the frequency domain range of carrier 1, first synchronization rasters are evenly spaced apart by floor(106/20)=5RB=900 kHz starting from the lowest position of the frequency domain of carrier 1. The terminal transmits or receives a sidelink synchronization signal and/or broadcast channel thereon. Floor( ) is rounded down to an integer.

Embodiment 4

The network-side device broadcasts the auxiliary information of the synchronization signal, corresponding to carrier 1, where SCS=15 kHz, and the pattern information of the synchronization raster indicates the global synchronization raster. For example, as defined in the protocol, when the SCS is 15 kHz, the global synchronization raster within the range of carrier 1 is 1200 kHz, and the GSCN is X to Y. In this case, the first synchronization raster is global synchronization rasters corresponding to the GSCNs from X to Y. The terminal transmits or receives a sidelink synchronization signal and/or broadcast channel thereon.

Embodiment 5

The network-side device broadcasts the auxiliary information of the synchronization signal, corresponding to carrier 1, where SCS=15 kHz, and the pattern information of the synchronization raster indicates that the frequency domain unit difference of the global synchronization raster is 3600 kHz. For example, as defined in the protocol, when the SCS is 15 kHz, the global synchronization raster within the range of carrier 1 is 1200 kHz, and the GSCN is X to Y. In this case, the first synchronization raster is a subset of global synchronization rasters evenly spaced apart by 3600 kHz within the range of the global synchronization rasters corresponding to the GSCNs of X to Y. For example, in one implementation form, numbers of the first synchronization rasters are X, X+3, X+6, . . . . The terminal transmits or receives a sidelink synchronization signal and/or broadcast channel thereon.

Embodiment 6

The network-side device broadcasts the auxiliary information of the synchronization signal, corresponding to carrier 1. The pattern information of the synchronization raster indicates that numbers of the relative synchronization rasters are X to Y. In this case, the first synchronization raster is the relative synchronization rasters corresponding to the numbers from X to Y. The terminal transmits or receives a sidelink synchronization signal and/or broadcast channel thereon.

Embodiment 7

The network-side device broadcasts the auxiliary information of the synchronization signal, corresponding to carrier 1, where SCS=15 kHz, the pattern information of the synchronization raster indicates that the frequency domain unit difference of the relative synchronization raster is rastergap1=1200 kHz, and indicates that numbers of the first synchronization raster are 2 and 4, and the frequency domain offset of the relative synchronization raster is offset1=10RB. In this case, within the frequency domain range of carrier 1, starting from a position 1800 kHz (ten 15 kHz RBs) away from the lowest position of the frequency domain of carrier 1, the relative synchronization rasters evenly spaced apart by 1200 kHz are numbered as 0, 1, 2, 3, 4, . . . , and M. The synchronization rasters corresponding to 2 and 4 is the first synchronization raster. The terminal transmits or receives a sidelink synchronization signal and/or broadcast channel thereon.

Embodiment 8

The network-side device broadcasts the auxiliary information of the synchronization signal, corresponding to carrier 1. The pattern information of the synchronization raster indicates the global synchronization raster, and provides a group of GSCNs from X to Y. In this case, the first synchronization raster is global synchronization rasters corresponding to the GSCNs from X to Y. The terminal transmits or receives a sidelink synchronization signal and/or broadcast channel thereon.

Embodiment 9

The network-side device broadcasts the auxiliary information of the synchronization signal, corresponding to carrier 1, where SCS=15 kHz, the pattern information of the synchronization raster indicates that the frequency domain unit difference of the relative synchronization raster is rastergap1=1200 kHz, stepsize=3, and the frequency domain offset of the relative synchronization raster is offset1=10RB. In this case, within the frequency domain range of carrier 1, first synchronization rasters are evenly spaced apart by 3600 kHz starting from a position 1800 kHz away from the lowest position of the frequency domain of carrier 1. The terminal transmits or receives a sidelink synchronization signal and/or broadcast channel thereon.

Embodiment 10

The network-side device broadcasts the auxiliary information of the synchronization signal, corresponding to carrier 1, where SCS=15 kHz, the pattern information of the synchronization raster indicates the global synchronization raster, and stepsize=3. For example, as defined in the protocol, when the SCS is 15 kHz, the global synchronization raster within the range of carrier 1 is 1200 kHz, and the GSCN is X to Y. In this case, the first synchronization raster is a subset of global synchronization rasters evenly spaced apart by 3600 kHz within the range of the global synchronization raster corresponding to the GSCNs of X to Y. For example, in one implementation form, numbers of the first synchronization rasters are X, X+3, X+6, . . . . The terminal transmits or receives a sidelink synchronization signal and/or broadcast channel thereon.

Embodiment 11

The network-side device broadcasts the auxiliary information of the synchronization signal, corresponding to carrier 1, where SCS=15 kHz, the pattern information of the synchronization raster indicates that the frequency domain unit difference of the relative synchronization raster is rastergap1=1200 kHz, the indication information of the synchronization raster indicates that a quantity N of the synchronization rasters is 3, and the frequency domain offset of the relative synchronization raster is offset1=10RB. In this case, within the frequency domain range of carrier 1, first synchronization rasters are the first three rasters in a set formed by relative synchronization rasters evenly spaced apart by 1200 kHz starting from a position 1800 kHz (ten 15 kHz RBs) away from the lowest position of the frequency domain of carrier 1. The terminal transmits or receives a sidelink synchronization signal and/or broadcast channel thereon.

Embodiment 12

The network-side device broadcasts the auxiliary information of the synchronization signal, corresponding to carrier 1, where SCS=15 kHz, the pattern information of the synchronization raster indicates the global synchronization raster, and the indication information of the synchronization raster indicates that a quantity N of the synchronization rasters is 5. For example, as defined in the protocol, when the SCS is 15 kHz, the global synchronization raster within the range of carrier 1 is 1200 kHz, and the GSCN is X to Y In this case, the first synchronization raster is five rasters in a set of global synchronization rasters evenly spaced apart by 1200 kHz within the range of the global synchronization raster corresponding to the GSCNs of X to Y. For example, in one implementation form, numbers of the first synchronization rasters are X', X'+1, X'+2, X'+3, X'+4, . . . ; and X' belongs to [X, Y]. The terminal transmits or receives a sidelink synchronization signal and/or broadcast channel thereon.

Embodiment 13

The network-side device broadcasts the auxiliary information of the synchronization signal, corresponding to carrier 1, where SCS=15 kHz, the pattern information of the synchronization raster indicates that the frequency domain unit difference of the relative synchronization raster is rastergap1=1200 kHz, the indication information of the synchronization raster includes bitmap information 11000000 of the synchronization raster, and the frequency domain offset of the relative synchronization raster is offset1=10RB. In this case, within the frequency domain range of carrier 1, starting from a position 1800 kHz (ten 15 kHz RBs) away from the lowest position of the frequency domain of carrier 1, there are eight relative synchronization rasters evenly spaced apart by 1200 kHz, numbered 0, 1, 2, 3, 4, . . . , and 7. Then, a relative synchronization raster corresponding to a high-order bit 2 (for example, global synchronization rasters corresponding to 7 and 6) in the bitmap information of the synchronization raster is the first synchronization raster. The terminal transmits or receives a sidelink synchronization signal and/or broadcast channel thereon.

Embodiment 14

The network-side device broadcasts the auxiliary information of the synchronization signal, corresponding to carrier 1, where SCS=15 kHz, the pattern information of the synchronization raster indicates the global synchronization raster, and the indication information of the synchronization raster includes bitmap information 11000000 of the synchronization raster. For example, as defined in the protocol, when the SCS is 15 kHz, the global synchronization raster within the range of carrier 1 is 1200 kHz, and the GSCN is 100 to 107. Then, a global synchronization raster corresponding to a high-order bit 2 (for example, global synchronization rasters corresponding to 107 and 106) in the bitmap information of the synchronization raster is the first synchronization raster. The terminal transmits or receives a sidelink synchronization signal and/or broadcast channel thereon.

Figure 2:
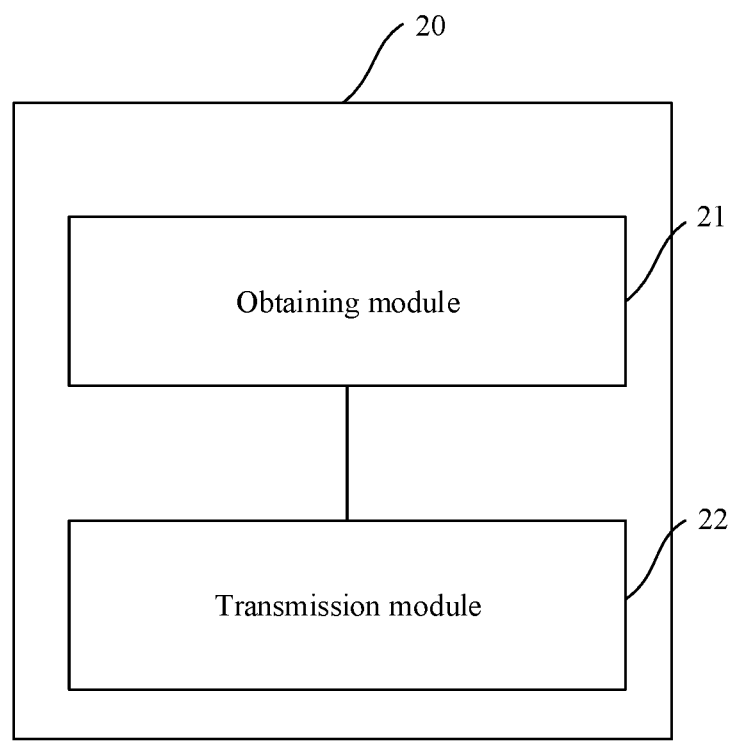
FIG. 2 is a schematic structural diagram of a communications device according to one embodiment of this disclosure.

Referring to FIG. 2, an embodiment of this disclosure further provides a communications device 20, including:
- an obtaining module 21, configured to obtain auxiliary information of a synchronization signal of a preset operation frequency band; and
- a transmission module 22, configured to transmit or receive the synchronization signal based on the auxiliary information.

The preset operation frequency band is an operation frequency band of a preset service, and the preset service is a sidelink service, an mMTC service, an NB-IoT service, or an IAB service; or the preset operation frequency band is an unlicensed frequency band.

In some embodiments of this disclosure, when the preset service is the sidelink service, the communications device is a terminal, and the auxiliary information is obtained in at least one of the following manners: being transmitted by a network-side device, being pre-configured on the terminal, being specified by the protocol, or being transmitted by another terminal.

When the preset operation frequency band is an unlicensed frequency band, or the preset service is an mMTC service, an NB-IoT service, or an IAB service, the communications device is a terminal or a network-side device; and when the communications device is a terminal, the terminal is a receiving device of the synchronization signal, and the auxiliary information is obtained in at least one of the following manners: being transmitted by the network-side device, being pre-configured on the terminal, or being specified by the protocol.

When the auxiliary information is transmitted by the network-side device, the network-side device uses system information, an RRC message, DCI, or a PDSCH to carry the auxiliary information.

In some embodiments of this disclosure, the auxiliary information includes at least one of the following: pattern information of a synchronization raster, or other related information of the synchronization signal.

In some embodiments of this disclosure, the other related information includes at least one of the following information:
- a carrier bandwidth;
- a frequency domain position of a carrier;
- synchronization signal sequence related information;
- a subcarrier spacing;
- a cyclic prefix length;
- a pattern of positions of the synchronization signal;
- a transmission period of the synchronization signal;
- whether the synchronization signal is transmitted periodically;
- a transmitting window length;
- a transmitting window periodicity;
- a receiving window length;
- a receiving window periodicity;
- a cell identity;
- a mapping relationship between a cell and a receive window of the synchronization signal;
- a transmission parameter;
- a pattern of rate matching resources;
- a to-be-punctured resource pattern;
- a time domain offset;
- a synchronization source;
- a filter parameter of the synchronization signal; or
- service discovery related information.

In some embodiments of this disclosure, the pattern information of the synchronization raster includes at least one of the following:
- a type of the synchronization raster, where the type of the synchronization raster includes: a relative synchronization raster and a global synchronization raster;
- a frequency domain unit difference between synchronization rasters;
- a frequency domain offset of the synchronization raster;
- a synchronization raster number;
- a step size S between adjacent synchronization raster numbers;
- indication information of the synchronization raster;
- a frequency domain position of the synchronization raster; or
- a measurement threshold of the synchronization raster.

In some embodiments of this disclosure, when the auxiliary information includes the pattern information of the synchronization raster, the transmission module is configured to: obtain, based on the pattern information of the synchronization raster, a first synchronization raster for transmitting or receiving the synchronization signal; and transmit or receive the synchronization signal on the first synchronization raster.

In some embodiments of this disclosure, the transmission module is configured to: if the pattern information of the synchronization raster includes the type of the synchronization raster, determine that a type of the first synchronization raster is a type indicated in the pattern information of the synchronization raster; and obtain the first synchronization raster based on the type of the first synchronization raster.

In some embodiments of this disclosure, the transmission module is configured to: if the pattern information of the synchronization raster does not include the type of the synchronization raster, consider that the first synchronization raster is a global synchronization raster or a relative synchronization raster by default; and obtain the first synchronization raster based on the type of the first synchronization raster.

In some embodiments of this disclosure, the transmission module is configured to: if the type of the first synchronization raster is the global synchronization raster, use the global synchronization raster as the first synchronization raster.

In some embodiments of this disclosure, if the type of the synchronization raster is the relative synchronization raster, a reference position corresponding to the relative synchronization raster is obtained; and if the pattern information of the synchronization raster includes the frequency domain unit difference between synchronization rasters, the first synchronization raster is frequency domain positions evenly spaced apart by the frequency domain unit difference between synchronization rasters starting from the reference position.

In some embodiments of this disclosure, if the pattern information of the synchronization raster includes the frequency domain unit difference between synchronization rasters and the frequency domain offset of the synchronization raster, the first synchronization raster is frequency domain positions evenly spaced apart by the frequency domain unit difference between synchronization rasters starting from a position that is away from the reference position by the frequency domain offset of the synchronization raster.

In some embodiments of this disclosure, if the type of the synchronization raster is the global synchronization raster, and the pattern information of the synchronization raster includes the frequency domain unit difference between synchronization rasters, global synchronization rasters evenly spaced apart by the frequency domain unit difference between synchronization rasters in the global synchronization raster are used as the first synchronization raster.

In some embodiments of this disclosure, the transmission module is configured to: if the pattern information of the synchronization raster includes the synchronization raster number and the number is a global synchronization raster number, obtain, from the global synchronization raster, a global synchronization raster corresponding to the number as the first synchronization raster.

In some embodiments of this disclosure, the transmission module is configured to: if the pattern information of the synchronization raster includes the synchronization raster number, and the number is a relative synchronization raster number, obtain the relative synchronization raster based on at least one of a reference position corresponding to the synchronization raster, the frequency domain unit difference between synchronization rasters, the frequency domain offset of the synchronization raster, the step size S between adjacent synchronization raster numbers, or a frequency domain position of the synchronization signal; and use a relative synchronization raster corresponding to the number as the first synchronization raster.

In some embodiments of this disclosure, the transmission module is configured to: if the pattern information of the synchronization raster includes the step size S between adjacent synchronization raster numbers, obtain the first synchronization raster based on the step size S between adjacent synchronization raster numbers.

In some embodiments of this disclosure, the transmission module is configured to: if the type of the first synchronization raster is the global synchronization raster, select synchronization rasters evenly spaced apart by S global synchronization rasters as the first synchronization raster.

In some embodiments of this disclosure, the transmission module is configured to: if the pattern information of the synchronization raster includes the step size S between adjacent synchronization raster numbers, obtain the first synchronization raster based on the type of the synchronization raster, the step size S between adjacent synchronization raster numbers, and pattern information of another synchronization raster, where the pattern information of the another synchronization raster includes at least one of a reference position corresponding to the synchronization raster, a frequency domain unit difference between synchronization rasters, a frequency domain offset of the synchronization raster, a number of the synchronization signal, indication information of the synchronization raster, or a frequency domain position of the synchronization raster.

In some embodiments of this disclosure, the transmission module is configured to: if the pattern information of the synchronization raster includes the indication information of the synchronization raster, the indication information of the synchronization raster includes a quantity N of the synchronization rasters, and the type of the synchronization raster is the global synchronization raster, select N global synchronization rasters from the global synchronization raster as the first synchronization raster.

In some embodiments of this disclosure, the transmission module is configured to: if the pattern information of the synchronization raster includes the indication information of the synchronization raster, the indication information of the synchronization raster includes a quantity N of the synchronization rasters, and the type of the synchronization raster is the relative synchronization raster, obtain the relative synchronization raster based on at least one of a reference position of the synchronization raster, the frequency domain unit difference between synchronization rasters, the frequency domain offset of the synchronization raster, the synchronization raster number, the step size S between adjacent synchronization raster numbers, or the frequency domain position of the synchronization raster; and select N relative synchronization rasters from the relative synchronization raster as the first synchronization raster.

In some embodiments of this disclosure, if the pattern information of the synchronization raster includes the indication information of the synchronization raster, the indication information of the synchronization raster includes a quantity N of the synchronization rasters, and the type of the synchronization raster is the relative synchronization raster, frequency domain positions evenly spaced apart by a fixed distance starting from a reference position corresponding to the synchronization raster are used as the first synchronization raster, where the fixed distance is equal to a result obtained by rounding up a carrier bandwidth/N.

In some embodiments of this disclosure, the transmission module is configured to: if the pattern information of the synchronization raster includes the indication information of the synchronization raster, the indication information of the synchronization raster includes bitmap information of the synchronization raster, and the type of the synchronization raster is the global synchronization raster, select a global synchronization raster corresponding to the bitmap information from the global synchronization raster as the first synchronization raster.

In some embodiments of this disclosure, the transmission module is configured to: if the pattern information of the synchronization raster includes the indication information of the synchronization raster, the indication information of the synchronization raster includes bitmap information of the synchronization rasters, and the type of the synchronization raster is the relative synchronization raster, obtain the relative synchronization raster based on at least one of a reference position of the synchronization raster, the frequency domain unit difference between synchronization rasters, the frequency domain offset of the synchronization raster, the synchronization raster number, the step size S between adjacent synchronization raster numbers, or the frequency domain position of the synchronization raster; and select a relative synchronization raster corresponding to the bitmap information from the relative synchronization raster as the first synchronization raster.

In some embodiments of this disclosure, the reference position is a lowest frequency domain position, a highest frequency domain position, or a central position of a carrier used for transmitting the synchronization signal.

In some embodiments of this disclosure, the reference position is configured by the network-side device, pre-configured in the communications device, or specified by the protocol.

In some embodiments of this disclosure, the transmission module is configured to: if a frequency domain range of the carrier is able to be determined based on the auxiliary information, and the first synchronization raster is at least partially located in the frequency domain range of the carrier, search for the synchronization signal for the terminal only in the first synchronization raster within the frequency domain range of the carrier.

In some embodiments of this disclosure, the transmission module is configured to: if a frequency domain range of the carrier is able to be determined based on the auxiliary information, and the first synchronization raster is at least partially located beyond the frequency domain range of the carrier, ignore, for the terminal, the first synchronization raster beyond the frequency domain range of the carrier.

In some embodiments of this disclosure, the transmission module is configured to: if a frequency domain position of the first synchronization raster overlaps a frequency domain position of a synchronization raster of an NR network, skip the overlapping frequency domain position.

In some embodiments of this disclosure, the transmission module is configured to: if the frequency domain position of the first synchronization raster overlaps the frequency domain position of the synchronization raster of the NR network, and at least one of a reference signal received power RSRP, a reference signal received quality RSRQ, or a reference signal received strength RSSI of a synchronization signal at the overlapping frequency domain position is greater than a corresponding measurement threshold, skip the overlapping frequency domain position.

In some embodiments of this disclosure, the transmission module is configured to: if the frequency domain position of the first synchronization raster overlaps the frequency domain position of the synchronization raster of the NR network, and at least one of a reference signal received power RSRP, a reference signal received quality RSRQ, or a reference signal received strength RSSI of a synchronization signal at the overlapping frequency domain position is greater than a corresponding measurement threshold, skip the overlapping frequency domain position.

Figure 3:
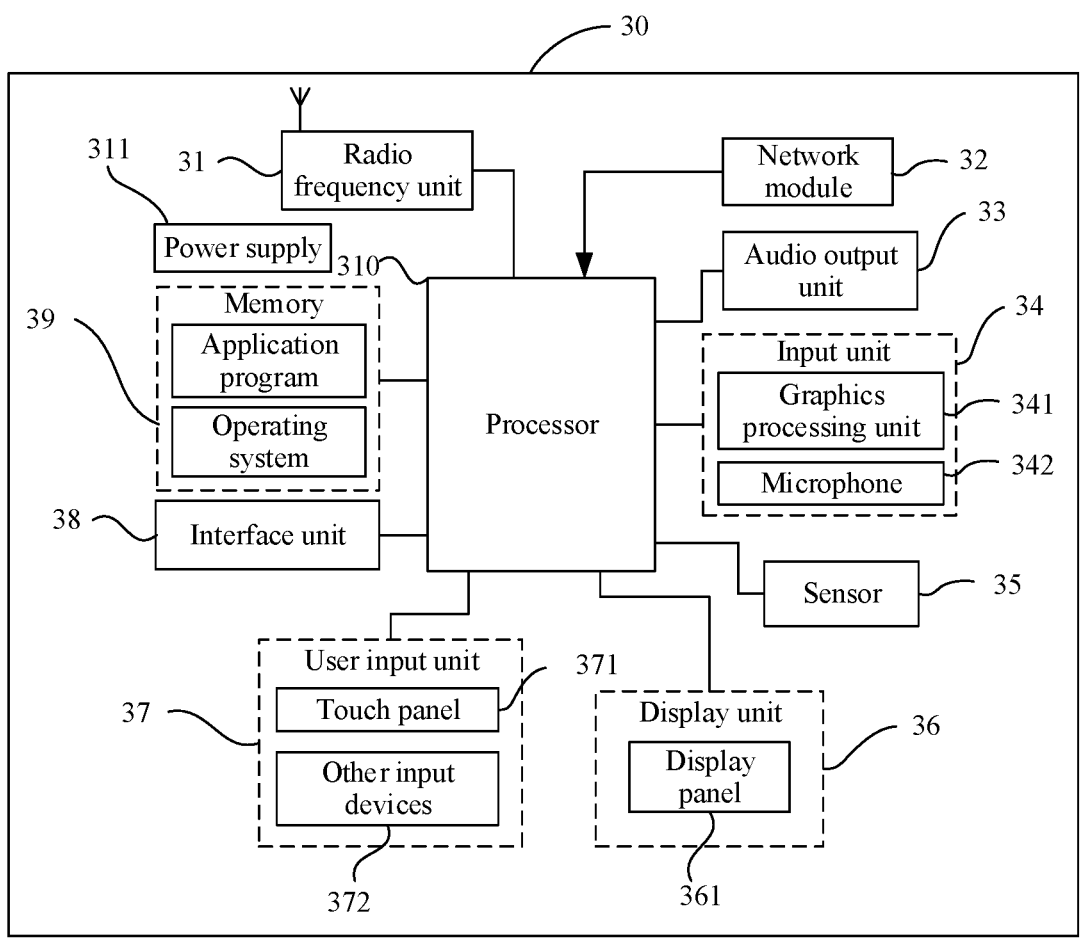
FIG. 3 is a schematic structural diagram of a terminal according to an embodiment of this disclosure.

Referring to FIG. 3, FIG. 3 is a schematic structural diagram of a terminal according to another embodiment of this disclosure. The terminal 30 includes but is not limited to components such as a radio frequency unit 31, a network module 32, an audio output unit 33, an input unit 34, a sensor 35, a display unit 36, a user input unit 37, an interface unit 38, a memory 39, a processor 310, and a power supply 311. Persons skilled in the art can understand that a structure of the terminal shown in FIG. 3 does not constitute any limitation on the terminal, and the terminal may include more or fewer components than those shown in the figure, or a combination of some components, or the components disposed differently. In some embodiment of this disclosure, the terminal includes but is not limited to a mobile phone, a tablet computer, a laptop computer, a palmtop computer, an in-vehicle terminal, a wearable device, a pedometer, and the like.

The processor 310 is configured to obtain auxiliary information of a synchronization signal of a preset operation frequency band.

The radio frequency unit 31 is configured to transmit or receive the synchronization signal based on the auxiliary information.

The preset operation frequency band is an operation frequency band of a preset service, and the preset service is a sidelink service, an mMTC service, an NB-IoT service, or an TAB service; or the preset operation frequency band is an unlicensed frequency band.

In some embodiments of this disclosure, a frequency domain position for transmitting or receiving the synchronization signal can be quickly determined based on the auxiliary information of the synchronization signal, thereby improving communication efficiency.

It should be understood that in some embodiment of this disclosure, the radio frequency unit 31 may be configured to: receive and transmit signals in an information receiving/transmitting process or a call process; and specifically, after receiving downlink data from a base station, transmit the downlink information to the processor 310 for processing, and in addition, transmit uplink data to the base station. Generally, the radio frequency unit 31 includes but is not limited to an antenna, at least one amplifier, a transceiver, a coupler, a low noise amplifier, a duplexer, and the like. In addition, the radio frequency unit 31 may also communicate with a network and other devices via a wireless communications system.

The terminal provides the user with wireless broadband Internet access through the network module 32, for example, helping the user to transmit and receive e-mails, browse web pages, and access streaming media.

The audio output unit 33 may convert audio data received by the radio frequency unit 31 or the network module 32 or stored in the memory 39 into an audio signal and output the audio signal as a sound. Furthermore, the audio output unit 33 may also provide audio output (for example, a call signal received sound or a message received sound) related to a specific function performed by the terminal 30. The audio output unit 33 includes a speaker, a buzzer, a phone receiver, and the like.

The input unit 34 is configured to receive an audio or video signal. The input unit 34 may include a graphics processing unit (Graphics Processing Unit, GPU) 341 and a microphone 342. The graphics processing unit 341 processes image data of a still picture or video obtained by an image capture apparatus (such as a camera) in a video capture mode or an image capture mode. A processed image frame may be displayed on the display unit 36. The image frame processed by the graphics processing unit 341 may be stored in the memory 39 (or another storage medium) or be transmitted by the radio frequency unit 31 or the network module 32. The microphone 342 is capable of receiving sounds and processing such sounds into audio data. The processed audio data can be converted into a format output that can be transmitted to a mobile communication base station through the radio frequency unit 31 in a telephone call mode.

The terminal 30 may further include at least one sensor 35, for example, an optical sensor, a motion sensor, and another sensor. Specifically, the optical sensor may include an ambient light sensor and a proximity sensor. The ambient light sensor may adjust luminance of the display panel 361 based on brightness of ambient light, and the proximity sensor may turn off the display panel 361 and/or backlight when the terminal 30 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 35 may also include a fingerprint sensor, a pressure sensor, an iris sensor, a molecular sensor, a gyroscope, a barometer, a hygrometer, a thermometer, an infrared sensor, and the like. Details are not described herein.

The display unit 36 is configured to display information input by the user or information provided to the user. The display unit 36 may include a display panel 361, and the display panel 361 may be configured in a form of a liquid crystal display (Liquid Crystal Display, LCD), an organic light-emitting diode (Organic Light-Emitting Diode, OLED), or the like.

The user input unit 37 may be configured to receive input digit or character information and generate key signal input related to user setting and function control of the mobile terminal. Specifically, the user input unit 37 may include a touch panel 371 and other input devices 372. The touch panel 371 is also referred to as a touchscreen and can collect a touch operation (such as an operation performed by the user on the touch panel 371 or near the touch panel 371 with a finger or by using any proper object or accessory such as a stylus) of the user on or near the touch panel 371. The touch panel 371 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and transmits the point coordinates to the processor 310, and receives and executes a command transmitted by the processor 310. In addition, the touch panel 371 may be implemented in a plurality of forms, for example, as a resistive, capacitive, infrared, or surface acoustic wave touch panel. In addition to the touch panel 371, the user input unit 37 may further include other input devices 372. Specifically, the other input devices 372 may include but are not limited to a physical keyboard, a function key (such as a volume control key or a power on/off key), a trackball, a mouse, a joystick, and the like. Details are not described herein.

Further, the touch panel 371 may cover the display panel 361. When detecting a touch operation on or near the touch panel 371, the touch panel 371 transmits the touch operation to the processor 310 to determine a type of a touch event. Then, the processor 310 provides a corresponding visual output on the display panel 361 based on the type of the touch event. Although in FIG. 3, the touch panel 371 and the display panel 361 act as two independent parts to implement input and output functions of the terminal, in some embodiments, the touch panel 371 and the display panel 361 may be integrated to implement the input and output functions of the terminal. This is not specifically limited herein.

The interface unit 38 is an interface between an external apparatus and the terminal 30. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 38 may be configured to: receive input (for example, data information and power) from the external apparatus, and transmit the received input to one or more elements in the terminal 30, or may be configured to transmit data between the terminal 30 and the external apparatus.

The memory 39 may be configured to store software programs and various data. The memory 39 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 39 may include a high-speed random access memory, and may further include a non-volatile memory such as a disk storage device, a flash memory device, or another volatile solid-state storage device.

The processor 310 is a control center of the terminal, and is connected to all components of the terminal by using various interfaces and lines. By running or executing a software program and/or module that is stored in the memory 39 and calling data stored in the memory 39, the processor 310 executes various functions of the terminal and processes data, so as to perform overall monitoring on the terminal. The processor 310 may include one or more processing units. Optionally, an application processor and a modem processor may be integrated in the processor 310. The application processor primarily processes an operating system, user interfaces, application programs, and the like. The modem processor primarily processes radio communication. It can be understood that the modem processor may alternatively be not integrated in the processor 310.

The terminal 30 may further include a power supply 311 (such as a battery) that supplies power to components. Optionally, the power supply 311 may be logically connected to the processor 310 through a power management system. In this way, functions such as charge management, discharge management, and power consumption management are implemented by using the power management system.

In addition, the terminal 30 includes some functional modules that are not shown. Details are not described herein.

Figure 4:
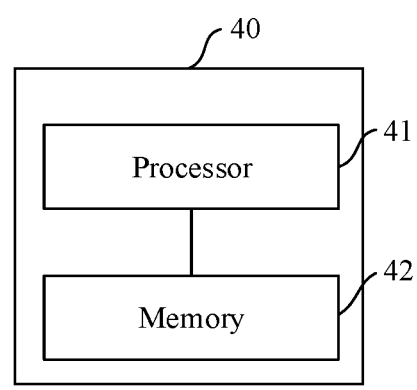
FIG. 4 is a schematic structural diagram of a communications device according to another embodiment of this disclosure.

Referring to FIG. 4, FIG. 4 is a schematic structural diagram of a communications device according to still another embodiment of this disclosure. The communications device 40 includes a processor 41 and a memory 42. In some embodiment of this disclosure, the communications device 40 further includes a computer program stored in the memory 42 and capable of running on the processor 41. When the computer program is executed by the processor 41, the following steps are implemented:

obtaining auxiliary information of a synchronization signal of a preset operation frequency band; and transmitting or receiving the synchronization signal based on the auxiliary information.

The preset operation frequency band is an operation frequency band of a preset service, and the preset service is a sidelink service, an mMTC service, an NB-IoT service, or an IAB service; or the preset operation frequency band is an unlicensed frequency band.

The processor 41 is responsible for managing a bus architecture and general processing, and the memory 42 can store data used by the processor 41 during operation.

Optionally, when the preset service is a sidelink service, the communications device is a terminal, and the auxiliary information is obtained in at least one of the following manners: being transmitted by a network-side device, being pre-configured on the terminal, being specified by the protocol, or being transmitted by another terminal.

When the preset operation frequency band is an unlicensed frequency band, or the preset service is an mMTC service, an NB-IoT service, or an IAB service, the communications device is a terminal or a network-side device; and when the communications device is a terminal, the terminal is a receiving device of the synchronization signal, and the auxiliary information is obtained in at least one of the following manners: being transmitted by the network-side device, being pre-configured on the terminal, or being specified by the protocol.

Optionally, when the auxiliary information is transmitted by the network-side device, the network-side device uses system information, an RRC message, DCI, or a PDSCH to carry the auxiliary information.

Optionally, the auxiliary information includes at least one of the following: pattern information of a synchronization raster, or other related information of the synchronization signal.

Optionally, the other related information includes at least one of the following information:
a carrier bandwidth;
a frequency domain position of a carrier;
synchronization signal sequence related information;
a subcarrier spacing;
a cyclic prefix length;
a pattern of positions of the synchronization signal;
a transmission period of the synchronization signal;
whether the synchronization signal is transmitted periodically;
a transmitting window length;
a transmitting window periodicity;
a receiving window length;
a receiving window periodicity;
a cell identity;
a mapping relationship between a cell and a receive window of the synchronization signal;
a transmission parameter;
a pattern of rate matching resources;
a to-be-punctured resource pattern;
a time domain offset;
a synchronization source;
a filter parameter of the synchronization signal; or
service discovery related information.

Optionally, the pattern information of the synchronization raster includes at least one of the following information:
a type of the synchronization raster, where the type of the synchronization raster includes a relative synchronization raster and a global synchronization raster;
a frequency domain unit difference between synchronization rasters;
a frequency domain offset of the synchronization raster;
a synchronization raster number;
a step size S between adjacent synchronization raster numbers;
indication information of the synchronization raster;
a frequency domain position of the synchronization raster; or
a measurement threshold of the synchronization raster.

Optionally, when the computer program is executed by the processor 41, the following steps can be further implemented.

When the auxiliary information includes the pattern information of the synchronization raster, the step of transmitting or receiving the synchronization signal based on the auxiliary information includes:
  obtaining, based on the pattern information of the synchronization raster, a first synchronization raster for transmitting or receiving the synchronization signal; and
  transmitting or receiving the synchronization signal on the first synchronization raster.

Optionally, when the computer program is executed by the processor 41, the following steps can be further implemented.

The step of obtaining, based on the pattern information of the synchronization raster, a first synchronization raster for transmitting or receiving the synchronization signal includes:
  if the pattern information of the synchronization raster includes the type of the synchronization raster, determining that a type of the first synchronization raster is a type indicated in the pattern information of the synchronization raster; and
  obtaining the first synchronization raster based on the type of the first synchronization raster.

Optionally, when the computer program is executed by the processor 41, the following steps can be further implemented.

The step of obtaining, based on the pattern information of the synchronization raster, a first synchronization raster for transmitting or receiving the synchronization signal includes:
  if the pattern information of the synchronization raster does not include the type of the synchronization raster, considering that the first synchronization raster is a global synchronization raster or a relative synchronization raster by default; and
  obtaining the first synchronization raster based on the type of the first synchronization raster.

Optionally, when the computer program is executed by the processor 41, the following steps can be further implemented.

The step of obtaining the first synchronization raster based on the type of the first synchronization raster includes:
  if the type of the first synchronization raster is the global synchronization raster, using the global synchronization raster as the first synchronization raster.

Optionally, when the computer program is executed by the processor 41, the following steps can be further implemented.

The step of obtaining, based on the pattern information of the synchronization raster, a first synchronization raster for transmitting or receiving the synchronization signal includes:
  if the type of the synchronization raster is the relative synchronization raster, obtaining a reference position corresponding to the relative synchronization raster; and
  if the pattern information of the synchronization raster includes the frequency domain unit difference between synchronization rasters, using frequency domain positions evenly spaced apart by the frequency domain unit difference between synchronization rasters starting from the reference position as the first synchronization raster.

Optionally, if the pattern information of the synchronization raster includes the frequency domain unit difference between synchronization rasters and the frequency domain offset of the synchronization raster, the first synchronization raster is frequency domain positions evenly spaced apart by the frequency domain unit difference between synchronization rasters starting from a position that is away from the reference position by the frequency domain offset of the synchronization raster.

Optionally, when the computer program is executed by the processor 41, the following steps can be further implemented.

The step of obtaining, based on the pattern information of the synchronization raster, a first synchronization raster for transmitting or receiving the synchronization signal includes:
  if the type of the synchronization raster is the global synchronization raster, and the pattern information of the synchronization raster includes the frequency domain unit difference between synchronization rasters, using global synchronization rasters evenly spaced apart by the frequency domain unit difference between synchronization rasters in the global synchronization raster as the first synchronization raster.

Optionally, when the computer program is executed by the processor 41, the following steps can be further implemented.

The step of obtaining, based on the pattern information of the synchronization raster, a first synchronization raster for transmitting or receiving the synchronization signal includes:
  if the pattern information of the synchronization raster includes the synchronization raster number and the number is a global synchronization raster number, obtaining, from the global synchronization raster, the global synchronization raster corresponding to the number as the first synchronization raster.

Optionally, when the computer program is executed by the processor 41, the following steps can be further implemented.

The step of obtaining, based on the pattern information of the synchronization raster, a first synchronization raster for transmitting or receiving the synchronization signal includes:
  if the pattern information of the synchronization raster includes the synchronization raster number, and the number is a relative synchronization raster number, obtaining the relative synchronization raster based on at least one of a reference position corresponding to the synchronization raster, the frequency domain unit difference between synchronization rasters, the frequency domain offset of the synchronization raster, the step size S between adjacent synchronization raster numbers, or a frequency domain position of the synchronization signal; and using a relative synchronization raster corresponding to the number as the first synchronization raster.

Optionally, when the computer program is executed by the processor 41, the following steps can be further implemented.

The step of obtaining, based on the pattern information of the synchronization raster, a first synchronization raster for transmitting or receiving the synchronization signal includes:
  if the pattern information of the synchronization raster includes the step size S between adjacent synchronization raster numbers, obtaining the first synchronization raster based on the step size S between adjacent synchronization raster numbers.

Optionally, when the computer program is executed by the processor 41, the following steps can be further implemented.

The step of obtaining the first synchronization raster based on the step size S between adjacent synchronization raster numbers includes:
if the type of the first synchronization raster is the global synchronization raster, selecting synchronization rasters evenly spaced apart by S global synchronization rasters as the first synchronization raster.

Optionally, when the computer program is executed by the processor 41, the following steps can be further implemented.

The step of obtaining the first synchronization raster based on the step size S between adjacent synchronization raster numbers includes:
if the pattern information of the synchronization raster includes the step size S between adjacent synchronization raster numbers, obtaining the first synchronization raster based on the type of the synchronization raster, the step size S between adjacent synchronization raster numbers, and pattern information of another synchronization raster, where the pattern information of the another synchronization raster includes at least one of a reference position corresponding to the synchronization raster, a frequency domain unit difference between synchronization rasters, a frequency domain offset of the synchronization raster, a number of the synchronization signal, indication information of the synchronization raster, or a frequency domain position of the synchronization raster.

Optionally, when the computer program is executed by the processor 41, the following steps can be further implemented.

The step of obtaining, based on the pattern information of the synchronization raster, a first synchronization raster for transmitting or receiving the synchronization signal includes:
if the pattern information of the synchronization raster includes the indication information of the synchronization raster, the indication information of the synchronization raster includes a quantity N of the synchronization rasters, and the type of the synchronization raster is the global synchronization raster, selecting N global synchronization rasters from the global synchronization raster as the first synchronization raster.

Optionally, when the computer program is executed by the processor 41, the following steps can be further implemented.

The step of obtaining, based on the pattern information of the synchronization raster, a first synchronization raster for transmitting or receiving the synchronization signal includes:
if the pattern information of the synchronization raster includes the indication information of the synchronization raster, the indication information of the synchronization raster includes a quantity N of the synchronization rasters, and the type of the synchronization raster is the relative synchronization raster, obtaining the relative synchronization raster based on at least one of a reference position of the synchronization raster, the frequency domain unit difference between synchronization rasters, the frequency domain offset of the synchronization raster, the synchronization raster number, the step size S between adjacent synchronization raster numbers, or the frequency domain position of the synchronization raster; and selecting N relative synchronization rasters from the relative synchronization raster as the first synchronization raster.

Optionally, when the computer program is executed by the processor 41, the following steps can be further implemented.

The step of obtaining, based on the pattern information of the synchronization raster, a first synchronization raster for transmitting or receiving the synchronization signal includes:
if the pattern information of the synchronization raster includes the indication information of the synchronization raster, the indication information of the synchronization raster includes a quantity N of the synchronization rasters, and the type of the synchronization raster is the relative synchronization raster, using frequency domain positions evenly spaced apart by a fixed distance starting from a reference position corresponding to the synchronization raster as the first synchronization raster, where the fixed distance is equal to a result obtained by rounding up a carrier bandwidth/N.

Optionally, when the computer program is executed by the processor 41, the following steps can be further implemented.

The step of obtaining, based on the pattern information of the synchronization raster, a first synchronization raster for transmitting or receiving the synchronization signal includes:
if the pattern information of the synchronization raster includes the indication information of the synchronization raster, the indication information of the synchronization raster includes bitmap information of the synchronization raster, and the type of the synchronization raster is the global synchronization raster, selecting a global synchronization raster corresponding to the bitmap information from the global synchronization raster as the first synchronization raster.

Optionally, when the computer program is executed by the processor 41, the following steps can be further implemented.

The step of obtaining, based on the pattern information of the synchronization raster, a first synchronization raster for transmitting or receiving the synchronization signal includes:
if the pattern information of the synchronization raster includes the indication information of the synchronization raster, the indication information of the synchronization raster includes bitmap information of the synchronization rasters, and the type of the synchronization raster is the relative synchronization raster, obtaining the relative synchronization raster based on at least one of a reference position of the synchronization raster, the frequency domain unit difference between synchronization rasters, the frequency domain offset of the synchronization raster, the synchronization raster number, the step size S between adjacent synchronization raster numbers, or the frequency domain position of the synchronization raster; and using a relative synchronization raster corresponding to the bitmap information as the first synchronization raster.

Optionally, the reference position is a lowest frequency domain position, a highest frequency domain position, or a central position of a carrier used for transmitting the synchronization signal.

Optionally, the reference position is configured by the network-side device, pre-configured in the communications device, or specified by the protocol.

Optionally, the communications device is a terminal, and when the computer program is executed by the processor 41, the following steps can be further implemented.

The step of obtaining, based on the pattern information of the synchronization raster, a first synchronization raster for receiving the synchronization signal includes:

if a frequency domain range of the carrier is able to be determined based on the auxiliary information, and the first synchronization raster is at least partially located in the frequency domain range of the carrier, searching, by the terminal, for the synchronization signal only in the first synchronization raster within the frequency domain range of the carrier.

Optionally, the communications device is a terminal, and when the computer program is executed by the processor 41, the following steps can be further implemented.

The communications device is a terminal, and the step of obtaining, based on the pattern information of the synchronization raster, a first synchronization raster for receiving the synchronization signal includes:

if a frequency domain range of the carrier is able to be determined based on the auxiliary information, and the first synchronization raster is at least partially located beyond the frequency domain range of the carrier, ignoring, by the terminal, the first synchronization raster beyond the frequency domain range of the carrier.

Optionally, when the computer program is executed by the processor 41, the following steps can be further implemented.

The step of obtaining, based on the pattern information of the synchronization raster, a first synchronization raster for transmitting or receiving the synchronization signal includes:

if a frequency domain position of the first synchronization raster overlaps a frequency domain position of a synchronization raster of a new radio NR network, skipping the overlapping frequency domain position.

Optionally, if the frequency domain position of the first synchronization raster overlaps the frequency domain position of the synchronization raster of the NR network, and at least one of a reference signal received power RSRP, a reference signal received quality RSRQ, or a reference signal received strength RSSI of a synchronization signal at the overlapping frequency domain position is greater than a corresponding measurement threshold, the overlapping frequency domain position is skipped.

An embodiment of this disclosure further provides a computer-readable storage medium, where a computer program is stored in the computer-readable storage medium. When the computer program is executed by a processor, processes of the foregoing signal transmission method embodiment can be implemented, with the same technical effects achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more restrictions, an element preceded by "includes a . . . " does not preclude the existence of other identical elements in the process, method, article, or apparatus that includes the element.

According to the foregoing description of the implementation manners, a person skilled in the art may clearly understand that the foregoing embodiments may be implemented by using software in combination with a necessary common hardware platform, and certainly may alternatively be implemented by using hardware. However, in most cases, the former is a preferred implementation manner. Based on such an understanding, the technical solutions of this disclosure essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A signal transmission method, performed by a communications device, the method comprising: obtaining auxiliary information of a synchronization signal of a preset operation frequency band, wherein the preset operation frequency band is an operation frequency band of a preset service, and the preset service is a sidelink service, wherein the auxiliary information comprises pattern information of a synchronization raster, wherein the pattern information of the synchronization raster comprises at least one of the following information: a type of the synchronization raster, wherein the type of the synchronization raster comprises: a relative synchronization raster or a global synchronization raster; a frequency domain unit difference between synchronization rasters; a frequency domain offset of the synchronization raster;

a synchronization raster number; a step size S between adjacent synchronization raster numbers; indication information of the synchronization raster; a frequency domain position of the synchronization raster; or a measurement threshold of the synchronization raster; and transmitting or receiving the synchronization signal based on the auxiliary information, comprising: obtaining a first synchronization raster for transmitting or receiving the synchronization signal based on the pattern information of the synchronization raster comprising: when the pattern information of the synchronization raster comprises the type of the synchronization raster, determining that a type of the first synchronization raster is the type indicated in the pattern information of the synchronization raster, and obtaining the first synchronization raster based on the type of the first synchronization raster; or when the pattern information of the synchronization raster does not comprise the type of the synchronization raster, considering that the first synchronization raster is a global synchronization raster or a relative synchronization raster by default, and obtaining the first synchronization raster based on the type of the first synchronization raster; or when the type of the synchronization raster is the relative synchronization raster, obtaining a reference position corresponding to the relative synchronization raster, and when the pattern information of the synchronization raster comprises the frequency domain unit difference between synchronization rasters, using frequency domain positions evenly spaced apart by the frequency domain unit difference between synchronization rasters starting from the reference position as the first synchronization raster; or when the type of the synchronization raster is the global synchronization raster, and the pattern information of the synchronization raster comprises the frequency domain unit difference between synchronization rasters, using global synchronization rasters evenly spaced apart by the frequency domain unit difference between synchronization rasters in the global synchronization raster as the first synchronization raster; or when the pattern information of the synchronization raster comprises the synchronization raster number, and the number is a relative synchronization raster number, obtaining the relative synchronization raster based on at least one of a reference position corresponding to the synchronization raster, the frequency domain unit difference between synchronization rasters, the frequency domain offset of the synchronization raster, the step size S between adjacent synchronization raster numbers, or a frequency domain position of the synchronization signal; and using a relative synchronization raster corresponding to the number as the first synchronization raster; or when the pattern information of the synchronization raster comprises the indication information of the synchronization raster, the indication information of the synchronization raster comprises a quantity N of the synchronization rasters, and the type of the synchronization raster is the global synchronization raster, selecting N global synchronization rasters from the global synchronization raster as the first synchronization raster; or when the pattern information of the synchronization raster comprises the indication information of the synchronization raster, the indication information of the synchronization raster comprises a quantity N of the synchronization rasters, and the type of the synchronization raster is the relative synchronization raster, obtaining the relative synchronization raster based on at least one of a reference position of the synchronization raster, the frequency domain unit difference between synchronization rasters, the frequency domain offset of the synchronization raster, the synchronization raster number, the step size S between adjacent synchronization raster numbers, or the frequency domain position of the synchronization raster; and selecting N relative synchronization rasters from the relative synchronization raster as the first synchronization raster; or when the pattern information of the synchronization raster comprises the indication information of the synchronization raster, the indication information of the synchronization raster comprises a quantity N of the synchronization rasters, and the type of the synchronization raster is the relative synchronization raster, using frequency domain positions evenly spaced apart by a fixed distance starting from a reference position corresponding to the synchronization raster as the first synchronization raster, wherein the fixed distance is equal to a result obtained by rounding up a carrier bandwidth/N; or when the pattern information of the synchronization raster comprises the indication information of the synchronization raster, the indication information of the synchronization raster comprises bitmap information of the synchronization raster, and the type of the synchronization raster is the global synchronization raster, selecting a global synchronization raster corresponding to the bitmap information from the global synchronization raster as the first synchronization raster; or when the pattern information of the synchronization raster comprises the indication information of the synchronization raster, the indication information of the synchronization raster comprises bitmap information of the synchronization rasters, and the type of the synchronization raster is the relative synchronization raster, obtaining the relative synchronization raster based on at least one of a reference position of the synchronization raster, the frequency domain unit difference between synchronization rasters, the frequency domain offset of the synchronization raster, the synchronization raster number, the step size S between adjacent synchronization raster numbers, or the frequency domain position of the synchronization raster; and selecting a relative synchronization raster corresponding to the bitmap information from the relative synchronization raster as the first synchronization raster.

2. The signal transmission method according to claim 1, wherein the communications device is a terminal, and the auxiliary information is obtained in at least one of the following manners: being transmitted by a network-side device, being pre-configured on the terminal, being specified by the protocol, or being transmitted by another terminal.

3. The signal transmission method according to claim 2, wherein when the auxiliary information is transmitted by the network-side device, the network-side device uses system information, a radio resource control (RRC) message, downlink control information (DCI), or a physical downlink shared data channel (PDSCH) to carry the auxiliary information.

4. The signal transmission method according to claim 1, wherein the auxiliary information further comprises related information of the synchronization signal.

5. The signal transmission method according to claim 4, wherein the related information further comprises at least one of the following information:
   a carrier bandwidth;
   a frequency domain position of a carrier;
   synchronization signal sequence related information;
   a subcarrier spacing;
   a cyclic prefix length;
   a pattern of positions of the synchronization signal;
   a transmission period of the synchronization signal;
   whether the synchronization signal is transmitted periodically;
   a transmitting window length;
   a transmitting window periodicity;
   a receiving window length;
   a receiving window periodicity;
   a cell identity;
   a mapping relationship between a cell and a receive window of the synchronization signal;
   a transmission parameter;
   a pattern of rate matching resources;
   a to-be-punctured resource pattern;
   a time domain offset;
   a synchronization source;
   a filter parameter of the synchronization signal; or
   service discovery related information.

6. The signal transmission method according to claim 1, wherein when the auxiliary information comprises the pattern information of the synchronization raster, the step of transmitting or receiving the synchronization signal based on the auxiliary information further comprises: -transmitting or receiving the synchronization signal on the first synchronization raster.

7. The signal transmission method according to claim 6, wherein the step of obtaining, based on the pattern information of the synchronization raster, a first synchronization raster for transmitting or receiving the synchronization signal comprises:
when the pattern information of the synchronization raster comprises the synchronization raster number and the number is a global synchronization raster number, obtaining, from the global synchronization raster, a global synchronization raster corresponding to the number as the first synchronization raster.

8. The signal transmission method according to claim 6, wherein the step of obtaining, based on the pattern information of the synchronization raster, a first synchronization raster for transmitting or receiving the synchronization signal comprises:
when the pattern information of the synchronization raster comprises the step size S between adjacent synchronization raster numbers, obtaining the first synchronization raster based on the step size S between adjacent synchronization raster numbers.

9. The signal transmission method according to claim 8, wherein the step of obtaining the first synchronization raster based on the step size S between adjacent synchronization raster numbers comprises:
when the type of the first synchronization raster is the global synchronization raster, selecting synchronization rasters evenly spaced apart by S global synchronization rasters as the first synchronization raster; or
when the pattern information of the synchronization raster comprises the step size S between adjacent synchronization raster numbers, obtaining the first synchronization raster based on the type of the synchronization raster, the step size S between adjacent synchronization raster numbers, and pattern information of another synchronization raster, wherein the pattern information of the another synchronization raster comprises at least one of a reference position corresponding to the another synchronization raster, a frequency domain unit difference between other synchronization rasters, a frequency domain offset of the another synchronization raster, a number of the synchronization signal, indication information of the another synchronization raster, or a frequency domain position of the another synchronization raster.

10. The signal transmission method according to claim 6, wherein the communications device is a terminal, and the step of obtaining, based on the pattern information of the synchronization raster, a first synchronization raster for receiving the synchronization signal comprises:
when a frequency domain range of the carrier is able to be determined based on the auxiliary information, and the first synchronization raster is at least partially located in the frequency domain range of the carrier, searching, by the terminal, for the synchronization signal only in the first synchronization raster within the frequency domain range of the carrier; or when a frequency domain range of the carrier is able to be determined based on the auxiliary information, and the first synchronization raster is at least partially located beyond the frequency domain range of the carrier, ignoring, by the terminal, the first synchronization raster beyond the frequency domain range of the carrier.

11. The signal transmission method according to claim 6, wherein the step of obtaining, based on the pattern information of the synchronization raster, a first synchronization raster for transmitting or receiving the synchronization signal comprises:
when a frequency domain position of the first synchronization raster overlaps a frequency domain position of a synchronization raster of a new radio NR network, skipping the overlapping frequency domain position, wherein
when the frequency domain position of the first synchronization raster overlaps the frequency domain position of the synchronization raster of the NR network, and at least one of a reference signal received power RSRP, a reference signal received quality RSRQ, or a reference signal received strength RSSI of a synchronization signal at the overlapping frequency domain position is greater than a corresponding measurement threshold, the overlapping frequency domain position is skipped.

12. The signal transmission method according to claim 1, wherein the reference position is a lowest frequency domain position, a highest frequency domain position, or a central position of a carrier used for transmitting the synchronization signal.

13. A communications device, comprising a processor; and a memory having a computer program stored therein wherein when the computer program is executed by the processor, the processor is configured to: obtain auxiliary information of a synchronization signal of a preset operation frequency band, wherein the preset operation frequency band is an operation frequency band of a preset service, and the preset service is a sidelink service, wherein the auxiliary information comprises pattern information of a synchronization raster, wherein the pattern information of the synchronization raster comprises at least one of the following information: a type of the synchronization raster, wherein the type of the synchronization raster comprises: a relative synchronization raster or a global synchronization raster; a frequency domain unit difference between synchronization rasters; a frequency domain offset of the synchronization raster;
a synchronization raster number; a step size S between adjacent synchronization raster numbers; indication information of the synchronization raster; a frequency domain position of the synchronization raster; or a measurement threshold of the synchronization raster; and
transmit or receive the synchronization signal based on the auxiliary information, wherein to transmit or receive the synchronization signal based on the auxiliary information, the processor is configured to: obtain a first synchronization raster for transmitting or receiving the synchronization signal based on the pattern information of the synchronization raster, wherein:
when the pattern information of the synchronization raster comprises the type of the synchronization raster, the processor is configured to determine that a type of the first synchronization raster is the type indicated in the pattern information of the synchronization raster, and obtain the first synchronization raster based on the type of the first synchronization raster; or when the pattern information of the synchronization raster does not comprise the type of the synchronization raster, the processor is configured to consider that the first synchronization raster is a global synchronization raster or a relative synchronization raster by default, and obtain the first synchronization raster based on the type of the first synchronization raster; or when the type of the synchronization raster is the relative synchronization raster, the processor is configured to obtain a reference position corresponding to the relative synchronization raster, and when the pattern information of the synchronization raster comprises the frequency domain unit difference between synchronization rasters, the processor is configured to use frequency domain positions evenly spaced apart by the frequency domain unit difference between synchronization rasters starting from the reference position as the first synchronization raster; or when the type of the synchronization raster is the global synchronization raster, and the pattern information of the synchronization raster comprises the frequency domain unit difference between synchronization rasters, the processor is configured to use global synchronization rasters evenly spaced apart by the frequency domain unit difference between synchronization rasters in the global synchronization raster as the first synchronization raster; or when the pattern information of the synchronization raster comprises the synchronization raster number, and the number is a relative synchronization raster number, the processor is configured to obtain the relative synchronization raster based on at least one of a reference position corresponding to the synchronization raster, the frequency domain unit difference between synchronization rasters, the frequency domain offset of the synchronization raster, the step size S between adjacent synchronization raster numbers, or a frequency domain position of the synchronization signal, and use a relative synchronization raster corresponding to the number as the first synchronization raster; or when the pattern information of the synchronization raster comprises the indication information of the synchronization raster, the indication information of the synchronization raster comprises a quantity N of the synchronization rasters, and the type of the synchronization raster is the global synchronization raster, the processor is configured to select N global synchronization rasters from the global synchronization raster as the first synchronization raster; or when the pattern information of the synchronization raster comprises the indication information of the synchronization raster, the indication information of the synchronization raster comprises a quantity N of the synchronization rasters, and the type of the synchronization raster is the relative synchronization raster, the processor is configured to obtain the relative synchronization raster based on at least one of a reference position of the synchronization raster, the frequency domain unit difference between synchronization rasters, the frequency domain offset of the synchronization raster, the synchronization raster number, the step size S between adjacent synchronization raster numbers, or the frequency domain position of the synchronization raster, and select N relative synchronization rasters from the relative synchronization raster as the first synchronization raster; or when the pattern information of the synchronization raster comprises the indication information of the synchronization raster, the indication information of the synchronization raster comprises a quantity N of the synchronization rasters, and the type of the synchronization raster is the relative synchronization raster, the processor is configured to use frequency domain positions evenly spaced apart by a fixed distance starting from a reference position corresponding to the synchronization raster as the first synchronization raster, wherein the fixed distance is equal to a result obtained by rounding up a carrier bandwidth/N; or when the pattern information of the synchronization raster comprises the indication information of the synchronization raster, the indication information of the synchronization raster comprises bitmap information of the synchronization raster, and the type of the synchronization raster is the global synchronization raster, the processor is configured to select a global synchronization raster corresponding to the bitmap information from the global synchronization raster as the first synchronization raster; or when the pattern information of the synchronization raster comprises the indication information of the synchronization raster, the indication information of the synchronization raster comprises bitmap information of the synchronization rasters, and the type of the synchronization raster is the relative synchronization raster, the processor is configured to obtain the relative synchronization raster based on at least one of a reference position of the synchronization raster, the frequency domain unit difference between synchronization rasters, the frequency domain offset of the synchronization raster, the synchronization raster number, the step size S between adjacent synchronization raster numbers, or the frequency domain position of the synchronization raster; and select a relative synchronization raster corresponding to the bitmap information from the relative synchronization raster as the first synchronization raster.

14. The communications device according to claim 13, wherein the auxiliary information further comprises related information of a synchronization signal.

15. The communications device according to claim 13, wherein when the auxiliary information comprises the pattern information of the synchronization raster, to transmit or receive the synchronization signal based on the auxiliary information, the processor is further configured to: transmit or receive the synchronization signal on the first synchronization raster.

16. The communications device according to claim 15, wherein to obtain, based on the pattern information of the synchronization raster, a first synchronization raster for transmitting or receiving the synchronization signal, the processor is further configured to:

obtain, from the global synchronization raster, a global synchronization raster corresponding to the number as the first synchronization raster, when the pattern information of the synchronization raster comprises the synchronization raster number and the number is a global synchronization raster number.

17. A non-transitory computer-readable storage medium, wherein a computer program is stored in the non-transitory computer-readable storage medium, and when the computer program is executed by a processor, a signal transmission method is performed, wherein the signal transmission method comprises: obtaining auxiliary information of a synchronization signal of a preset operation frequency band, wherein the preset operation frequency band is an operation frequency band of a preset service, and the preset service is a sidelink service, wherein the auxiliary information comprises pattern information of a synchronization raster, the pattern information of the synchronization raster comprises at least one of the following information: a type of the synchronization raster, wherein the type of the synchronization raster comprises: a relative synchronization raster or a global synchronization raster; a frequency domain unit difference between synchronization rasters; a frequency domain offset of the synchronization raster;

a synchronization raster number;

a step size S between adjacent synchronization raster numbers;

indication information of the synchronization raster;

a frequency domain position of the synchronization raster; or a measurement threshold of the synchronization raster; and transmitting or receiving the synchronization signal based on the auxiliary information, comprising: obtaining a first synchronization raster for transmitting or receiving the synchronization signal based on the pattern information of the synchronization raster comprising:

when the pattern information of the synchronization raster comprises the type of the synchronization raster, determining that a type of the first synchronization raster is the type indicated in the pattern information of the synchronization raster, and obtaining the first synchronization raster based on the type of the first synchronization raster; or when the pattern information of the synchronization raster does not comprise the type of the synchronization raster, considering that the first synchronization raster is a global synchronization raster or a relative synchronization raster by default, and obtaining the first synchronization raster based on the type of the first synchronization raster; or when the type of the synchronization raster is the relative synchronization raster, obtaining a reference position corresponding to the relative synchronization raster, and when the pattern information of the synchronization raster comprises the frequency domain unit difference between synchronization rasters, using frequency domain positions evenly spaced apart by the frequency domain unit difference between synchronization rasters starting from the reference position as the first synchronization raster; or when the type of the synchronization raster is the global synchronization raster, and the pattern information of the synchronization raster comprises the frequency domain unit difference between synchronization rasters, using global synchronization rasters evenly spaced apart by the frequency domain unit difference between synchronization rasters in the global synchronization raster as the first synchronization raster; or when the pattern information of the synchronization raster comprises the synchronization raster number, and the number is a relative synchronization raster number, obtaining the relative synchronization raster based on at least one of a reference position corresponding to the synchronization raster, the frequency domain unit difference between synchronization rasters, the frequency domain offset of the synchronization raster, the step size S between adjacent synchronization raster numbers, or a frequency domain position of the synchronization signal; and using a relative synchronization raster corresponding to the number as the first synchronization raster; or when the pattern information of the synchronization raster comprises the indication information of the synchronization raster, the indication information of the synchronization raster comprises a quantity N of the synchronization rasters, and the type of the synchronization raster is the global synchronization raster, selecting N global synchronization rasters from the global synchronization raster as the first synchronization raster; or when the pattern information of the synchronization raster comprises the indication information of the synchronization raster, the indication information of the synchronization raster comprises a quantity N of the synchronization rasters, and the type of the synchronization raster is the relative synchronization raster, obtaining the relative synchronization raster based on at least one of a reference position of the synchronization raster, the frequency domain unit difference between synchronization rasters, the frequency domain offset of the synchronization raster, the synchronization raster number, the step size S between adjacent synchronization raster numbers, or the frequency domain position of the synchronization raster; and selecting N relative synchronization rasters from the relative synchronization raster as the first synchronization raster; or when the pattern information of the synchronization raster comprises the indication information of the synchronization raster, the indication information of the synchronization raster comprises a quantity N of the synchronization rasters, and the type of the synchronization raster is the relative synchronization raster, using frequency domain positions evenly spaced apart by a fixed distance starting from a reference position corresponding to the synchronization raster as the first synchronization raster, wherein the fixed distance is equal to a result obtained by rounding up a carrier bandwidth/N; or when the pattern information of the synchronization raster comprises the indication information of the synchronization raster, the indication information of the synchronization raster comprises bitmap information of the synchronization raster, and the type of the synchronization raster is the global synchronization raster, selecting a global synchronization raster corresponding to the bitmap information from the global synchronization raster as the first synchronization raster; or when the pattern information of the synchronization raster comprises the indication information of the synchronization raster, the indication information of the synchronization raster comprises bitmap information of the synchronization rasters, and the type of the synchronization raster is the relative synchronization raster, obtaining the relative synchronization raster based on at least one of a reference position of the synchronization raster, the frequency domain unit difference between synchronization rasters, the frequency domain offset of the synchronization raster, the synchronization raster number, the step size S between adjacent synchronization raster numbers, or the frequency domain position of the synchronization raster, and selecting a relative synchronization raster corresponding to the bitmap information from the relative synchronization raster as the first synchronization raster.

* * * * *